(12) United States Patent
Tsai et al.

(10) Patent No.: US 11,140,567 B2
(45) Date of Patent: Oct. 5, 2021

(54) METHOD AND APPARATUS FOR TRIGGERING A BEAM STATE INFORMATION REPORT IN A WIRELESS COMMUNICATION SYSTEM

(71) Applicant: ASUSTek Computer Inc., Taipei (TW)

(72) Inventors: Hsin-Hsi Tsai, Taipei (TW); Meng-Hui Ou, Taipei (TW); Richard Lee-Chee Kuo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 16/407,091

(22) Filed: May 8, 2019

(65) Prior Publication Data

US 2019/0268794 A1 Aug. 29, 2019

Related U.S. Application Data

(63) Continuation of application No. 15/816,451, filed on Nov. 17, 2017, now abandoned.

(60) Provisional application No. 62/443,238, filed on Jan. 6, 2017.

(51) Int. Cl.
*H04W 24/10* (2009.01)
*H04W 16/28* (2009.01)

(52) U.S. Cl.
CPC ............ *H04W 24/10* (2013.01); *H04W 16/28* (2013.01)

(58) Field of Classification Search
None
See application file for complete search history.

(56) References Cited

U.S. PATENT DOCUMENTS

| | | | | |
|---|---|---|---|---|
| 2017/0055187 | A1* | 2/2017 | Kang | H04W 36/0058 |
| 2017/0367082 | A1* | 12/2017 | Yu | H04B 7/0617 |
| 2018/0138962 | A1* | 5/2018 | Islam | H04L 5/0032 |
| 2018/0219604 | A1* | 8/2018 | Lu | H04B 7/0695 |
| 2019/0319686 | A1* | 10/2019 | Chen, IV | H04W 72/046 |
| 2020/0260430 | A1* | 8/2020 | Grant | H04B 7/0695 |

* cited by examiner

*Primary Examiner* — Kodzovi Acolatse
(74) *Attorney, Agent, or Firm* — Skaar Ulbrich Macari, P.A.

(57) ABSTRACT

Methods and apparatuses for triggering a beam state information report by a user equipment in a wireless communication system are disclosed herein. In one method, a user equipment measures multiple beam reference signals of non-serving beams from a cell and derives multiple values from measurements. The UE derives a first value, wherein the first value is a highest value, a lowest value, or an average value of the multiple values. The UE triggers to report a measurement result for a beam reference signal if at least one condition is satisfied, wherein the condition is based on comparing the first value to a threshold.

20 Claims, 26 Drawing Sheets

| Value of BRRS resource allocation field | Description | |
|---|---|---|
| | Subframe type allocation | Symbol type allocation |
| '00' | 5 symbols in slot 0 | $13^{th}$ symbol |
| '01' | 5 symbols in slot 1 | $14^{th}$ symbol |
| '10' | 10 symbols | 13 & $14^{th}$ symbols |
| '11' | Reserved | Reserved |

FIG. 5 (PRIOR ART)

| Value of BRRS process indication field | Description |
|---|---|
| '00' | The first BR process configured by the higher layers |
| '01' | The second BR process configured by the higher layers |
| '10' | The third BR process configured by the higher layers |
| '11' | The fourth BR process configured by the higher layers |

FIG. 6 (PRIOR ART)

| | Description | Bit length |
|---|---|---|
| BRRS resource ID 0, BRRS resource ID 1, ..., BRRS resource ID 7 | Antenna Ports to be measured for each BRRS resource (up to 8 ports) (8 bit bitmap for ports 600 to 607). | 8*8=64bits |
| Resource allocation type | 0 : subframe type allocation<br>1 : symbol type allocation | 1 bits |
| VCID | Virtual cell ID | 9 bits |

FIG. 7 (PRIOR ART)

| BRSRP index | Measured quantity value [dBm] |
|---|---|
| 0 | BRSRP < -140 |
| 1 | -140 ≤ BRSRP < -139 |
| 2 | -139 ≤ BRSRP < -138 |
| ... | ... |
| 95 | -46 ≤ BRSRP < -45 |
| 96 | -45 ≤ BRSRP < -44 |
| 97 | -44 ≤ BRSRP |

FIG. 8 (PRIOR ART)

| Reported value | Measured quantity value | Unit |
|---|---|---|
| 0 | BRRS-RP < -140 | dBm |
| 1 | -140 ≤ BRRS-RP < -139 | dBm |
| 2 | -139 ≤ BRRS-RP < -138 | dBm |
| ... | ... | ... |
| 95 | -46 ≤ BRRS-RP < -45 | dBm |
| 96 | -45 ≤ BRRS-RP < -44 | dBm |
| 97 | -44 ≤ BRRS-RP | dBm |

FIG. 9 (PRIOR ART)

| BRRS-RI | BRRS resource ID |
|---|---|
| 0 | 0 |
| 1 | 1 |
| 2 | 2 |
| 3 | 3 |
| 4 | 4 |
| 5 | 5 |
| 6 | 6 |
| 7 | 7 |

FIG. 10 (PRIOR ART)

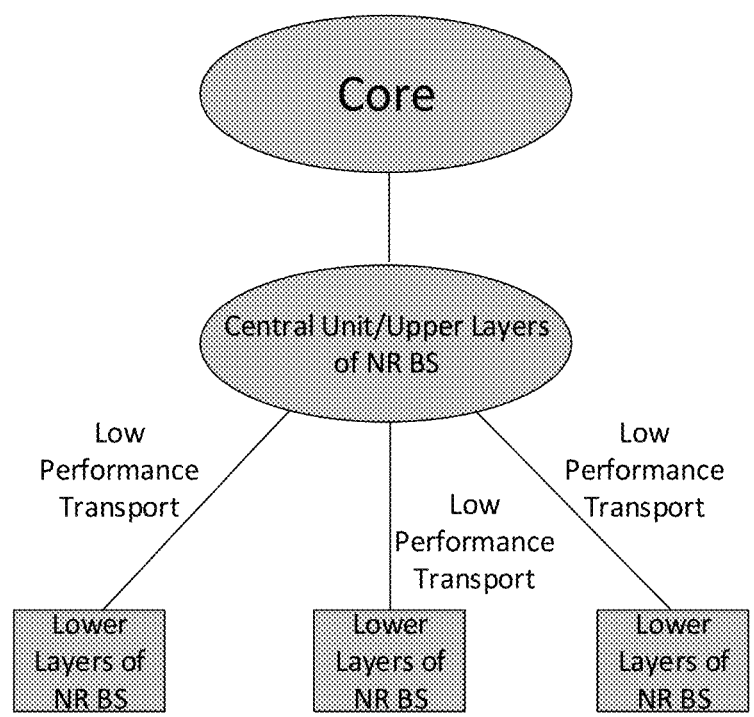
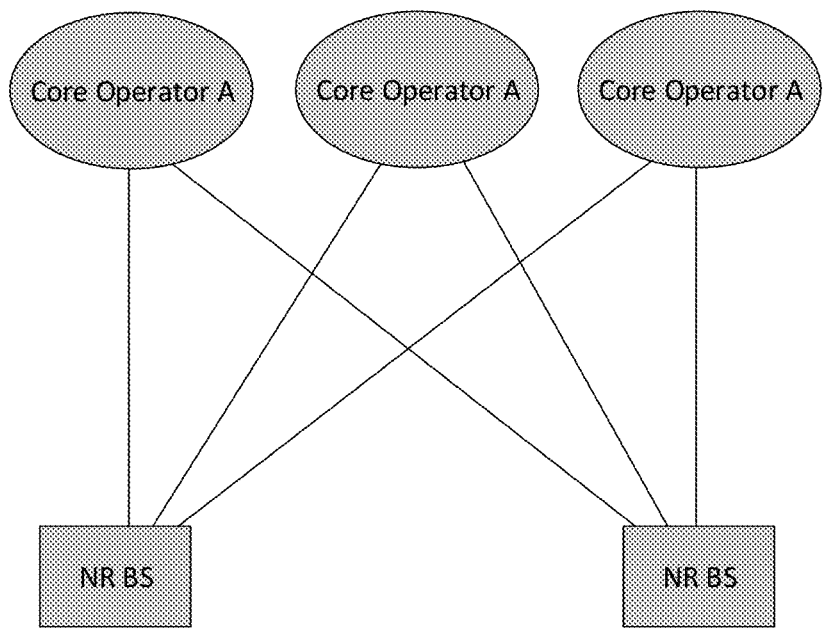
FIG. 14 (PRIOR ART)

METHOD AND APPARATUS FOR TRIGGERING A BEAM STATE INFORMATION REPORT IN A WIRELESS COMMUNICATION SYSTEM

CROSS-REFERENCE TO RELATED APPLICATIONS

This application is a continuation of U.S. patent application Ser. No. 15/816,451, filed on Nov. 17, 2017, which claims the benefit of U.S. Provisional Patent Application Ser. No. 62/443,238 filed on Jan. 6, 2017, the entire disclosures of which are incorporated herein in its entirety by reference.

FIELD

This disclosure generally relates to wireless communication networks, and more particularly, to a method and apparatus for triggering a beam state information report in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

Methods and apparatuses for triggering a beam state information report in a wireless communication system are disclosed herein. In one method, a user equipment measures multiple beam reference signals of non-serving beams from a cell and derives multiple values from measurements. The UE derives a first value, wherein the first value is a highest value, a lowest value, or an average value of the multiple values. The UE triggers to report a measurement result for a beam reference signal if at least one condition is satisfied, wherein the condition is based on comparing the first value to a threshold.

BRIEF DESCRIPTION OF THE DRAWINGS

FIG. 5 is a reproduction of Table 5.2-1 from KT 5G-SIG TS 5G.213 v1.9 illustrating BRRS resource allocation field for xPDCCH with DL or UL DCI.

FIG. 6 is a reproduction of Table 5.2-2 from KT 5G-SIG TS 5G.213 v1.9 illustrating BRRS process indication field for xPDCCH with DL or UL DCI.

FIG. 7 is a reproduction of Table 5.2-3 from KT 5G-SIG TS 5G.213 v1.9 illustrating BR process configuration.

FIG. 8 is a reproduction of Table 8.3.3.1-1 from KT 5G-SIG TS 5G.213 v1.9 illustrating a 7-bit BRSRP Table.

FIG. 9 is a reproduction of Table 8.4.3.1-1 from KT 5G-SIG TS 5G.213 v1.9 illustrating a 7-bit BRRS-RP mapping.

FIG. 10 is a reproduction of Table 8.4.3.2-1 from KT 5G-SIG TS 5G.213 v1.9 illustrating BRRS-RI mapping.

FIG. 14 illustrates a centralized baseband with low performance transport and shared RAN as shown in 3GPP R3-160947, TR 38.801 V0.1.0.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including: R2-162366, "Beam Forming Impacts"; R2-163716, "Discussion on terminology of beamforming based high frequency NR"; R2-162709, "Beam support in NR"; R2-162762, "Active Mode Mobility in NR: SINR drops in higher frequencies"; R3-160947, TR 38.801 V0.1.0, "Study on New Radio Access Technology; Radio Access Architecture and Interfaces"; R2-164306, "Summary of email discussion [93bis #23][NR] Deployment scenarios"; RAN2 #94 meeting minutes; R2-162251, "RAN2 aspects of high frequency New RAT"; R2-163879, "RAN2 Impacts in HF-NR"; R2-162210, "Beam level management <-> Cell level mobility"; R2-163471, "Cell concept in NR"; and 3GPP TS 36.331 V13.1.0. Additionally, the exemplary wireless communications systems devices may be designed to support the KT PyeongChang 5G Special Interest Group (KT 5G-SIG) standards, including: TS 5G.213 v1.9, "KT 5G Physical layer procedures (Release 1)"; TS 5G.321 v1.2, "KT 5G MAC protocol specification (Release 1)"; TS 5G.211 v2.6, "KT 5G Physical channels and modulation (Release 1)" and TS 5G.212 v2.3, "KT 5G Physical Layer Multiplexing and channel coding (Release 1)". The standards and documents listed above are hereby expressly incorporated by reference in their entirety.

Figure 1:
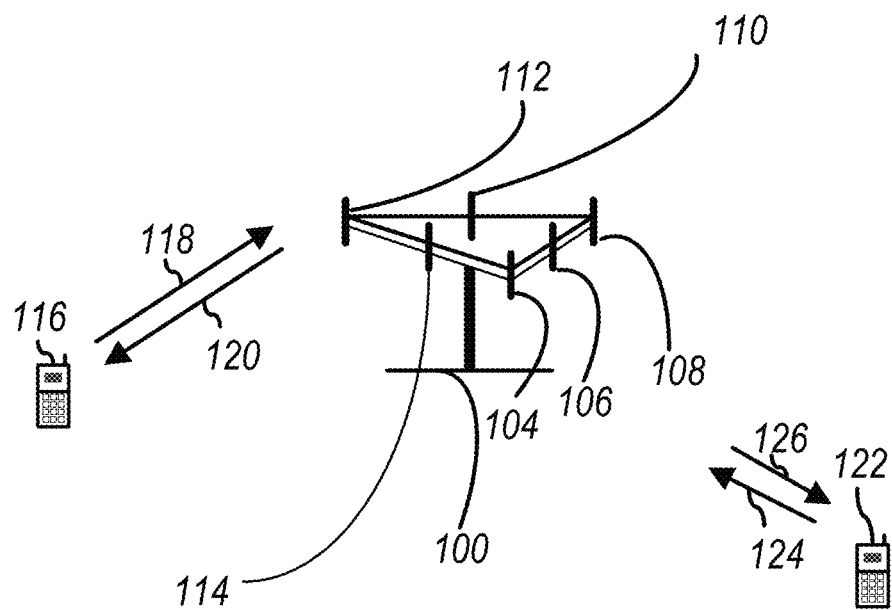
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
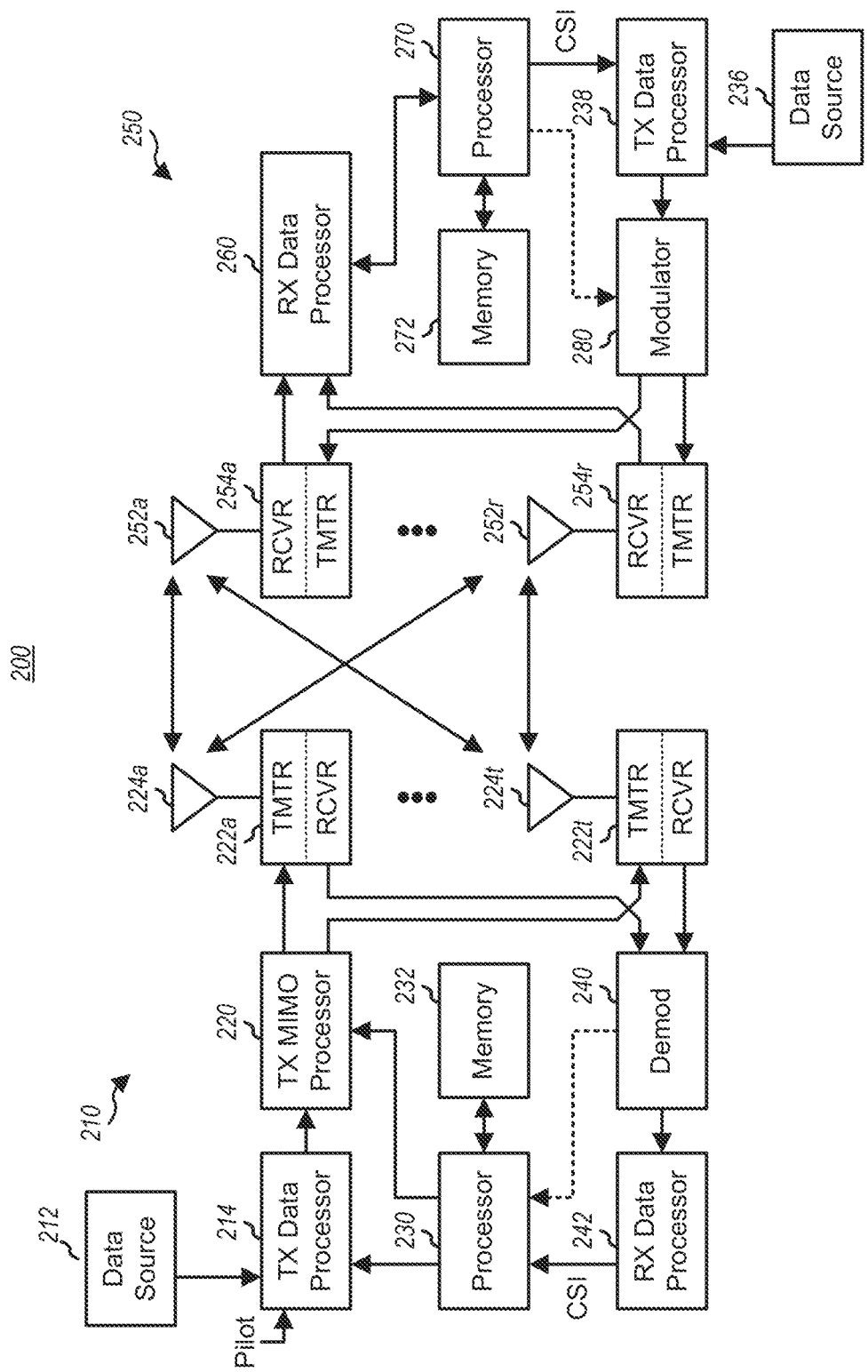
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
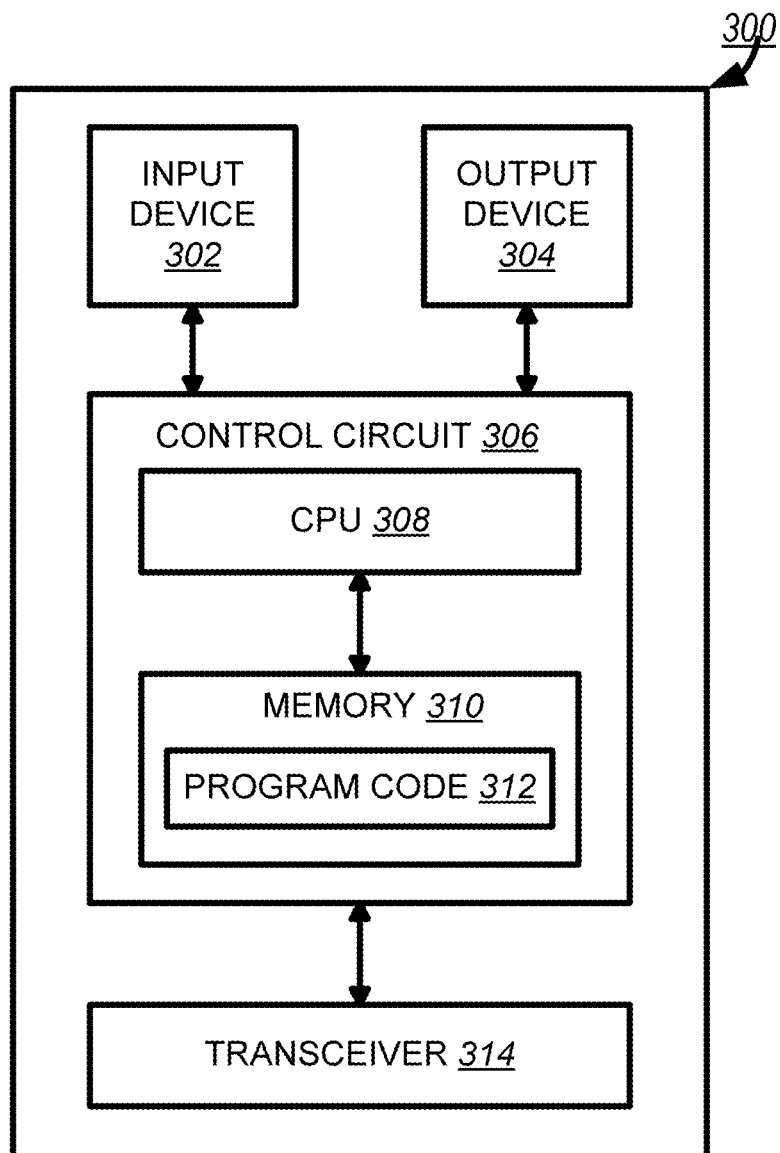
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
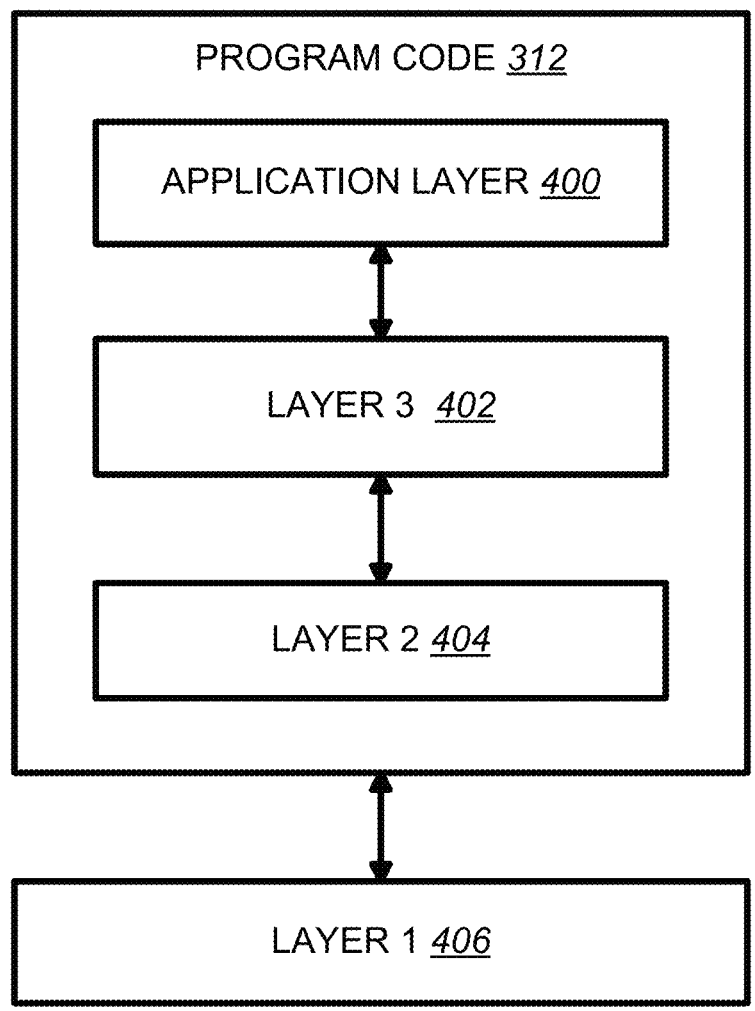
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP standardization activities on next generation (i.e. 5G) access technology have been launched since March 2015. The next generation access technology aims to support the following three families of usage scenarios for satisfying both the urgent market needs and the more long-term requirements set forth by the ITU-R IMT-2020:

eMBB (enhanced Mobile Broadband)
    mMTC (massive Machine Type Communications)
    URLLC (Ultra-Reliable and Low Latency Communications).

An objective of the 5G study item on new radio access technology is to identify and develop technology components needed for new radio systems which should be able to use any spectrum band ranging at least up to 100 GHz. Supporting carrier frequencies up to 100 GHz brings a number of challenges in the area of radio propagation. As the carrier frequency increases, the path loss also increases.

Based on 3GPP R2-162366, in lower frequency bands (e.g. current LTE bands<6 GHz) the required cell coverage may be provided by forming a wide sector beam for transmitting downlink common channels. However, utilizing wide sector beam on higher frequencies (>>6 GHz) the cell coverage is reduced with same antenna gain. Thus, in order to provide required cell coverage on higher frequency bands, higher antenna gain is needed to compensate the increased path loss. To increase the antenna gain over a wide sector beam, larger antenna arrays (number of antenna elements ranging from tens to hundreds) are used to form high gain beams.

As a consequence, the high gain beams are narrow compared to a wide sector beam so multiple beams for transmitting downlink common channels are needed to cover the required cell area. The number of concurrent high gain beams that access point is able to form may be limited by the cost and complexity of the utilized transceiver architecture. In practice, on higher frequencies, the number of concurrent high gain beams is much less than the total number of beams required to cover the cell area. In other words, the access point is able to cover only part of the cell area by using a subset of beams at any given time.

Based on 3GPP R2-163716, beamforming is a signal processing technique used in antenna arrays for directional signal transmission/reception. With beamforming, a beam can be formed by combining elements in a phased array of antennas in such a way that signals at particular angles experience constructive interference while others experience destructive interference. Different beams can be utilized simultaneously using multiple arrays of antennas.

Figure 12:
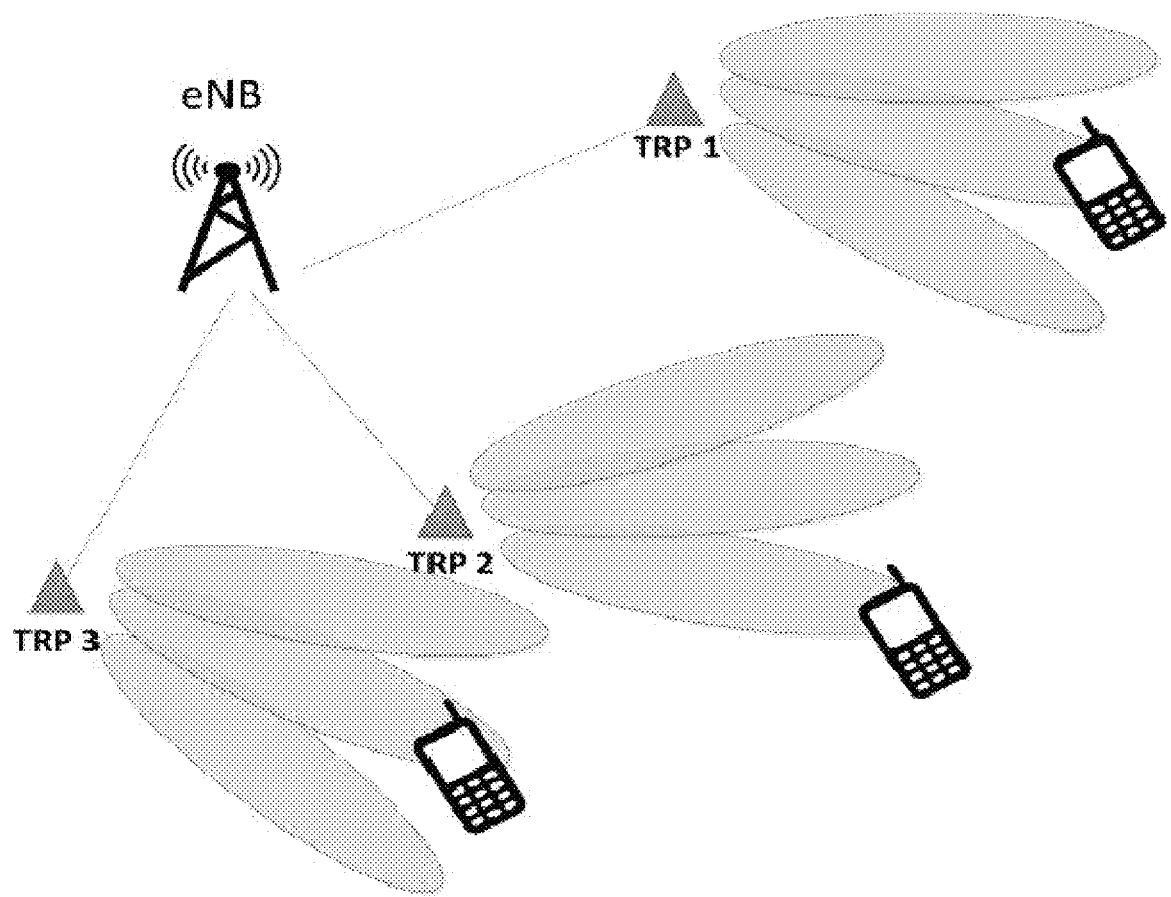
FIG. 12 illustrates a beam concept in 5G as shown in 3GPP R2-162709.

Based on 3GPP R2-162709 and as shown in FIG. 12, an evolved Node B (eNB) may have multiple Transmission/Reception Points (TRPs) (either centralized or distributed). Each TRP can form multiple beams. The number of beams and the number of simultaneous beams in the time/frequency domain depend on the number of antenna array elements and the radiofrequency (RF) at the TRP.

Potential mobility type for New RAT (NR) can be listed as follows: intra-TRP mobility; inter-TRP mobility; and inter-NR eNB mobility.

Based on 3GPP R2-162762, reliability of a system purely relying on beamforming and operating in higher frequencies might be challenging, since the coverage might be more sensitive to both time and space variations. As a consequence of that the Signal to interference plus noise ratio (SINR) of that narrow link can drop much quicker than in the case of LTE.

Using antenna arrays at access nodes with the number of elements in the hundreds, fairly regular grid-of-beams coverage patterns with tens or hundreds of candidate beams per node may be created. The coverage area of an individual beam from such array may be small, down to the order of some tens of meters in width. As a consequence, channel quality degradation outside the current serving beam area is quicker than in the case of wide area coverage, as provided by LTE.

Figure 13:
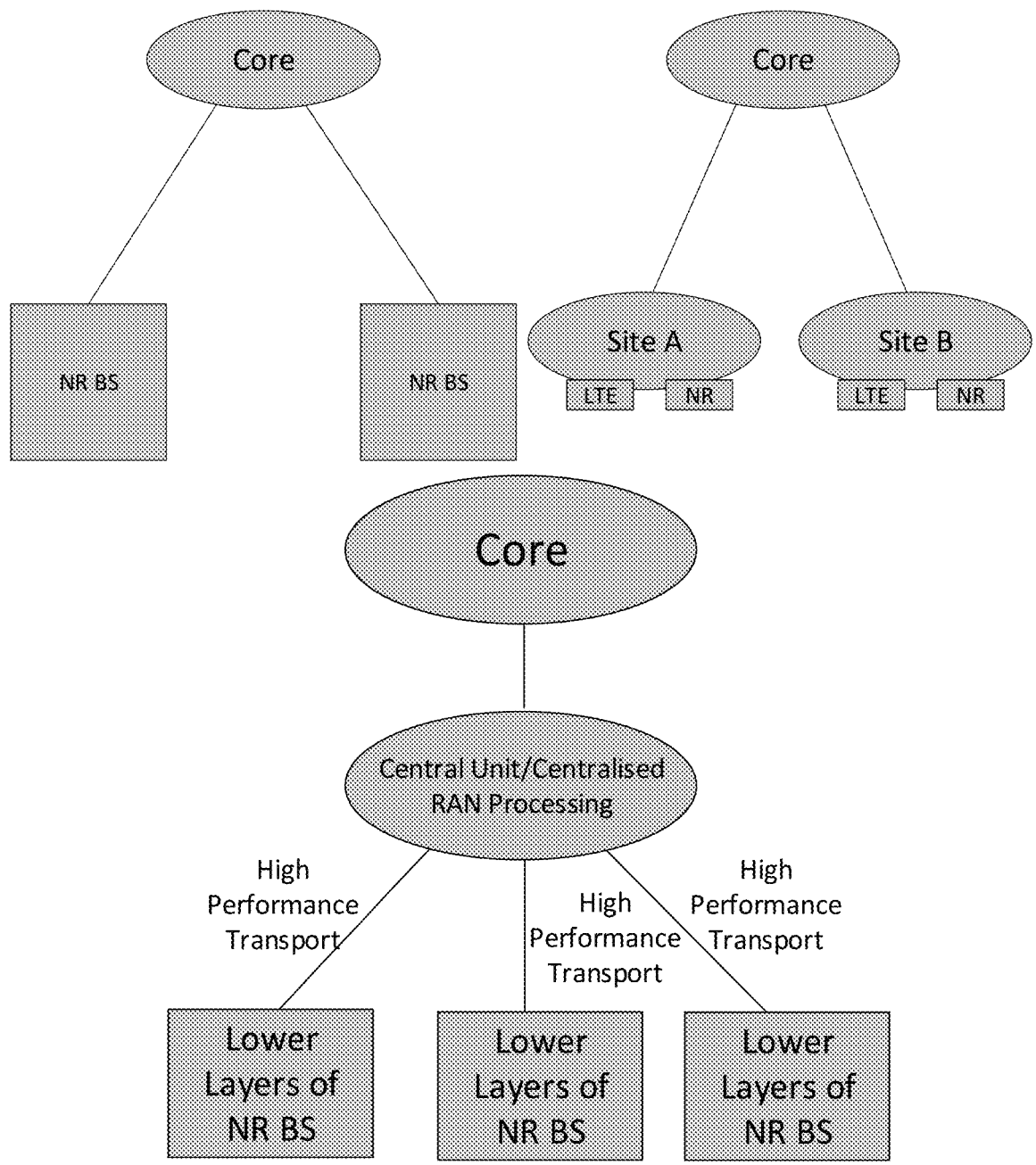
FIG. 13 illustrates stand-alone, co-sited with LTE, and a centralized baseband as shown in 3GPP R3-160947, TR 38.801 V0.1.0.

Based on 3GPP R3-160947, TR 38.801 V0.1.0, the scenarios illustrated in FIGS. 13-14 should be considered for support by the NR radio network architecture.

Based on 3GPP R2-164306, the following scenarios in terms of cell layout for standalone NR are captured to be studied: macro cell only deployment; heterogeneous deployment; and small cell only deployment.

Based on 3GPP RAN2 #94 meeting minutes, 1 NR eNB (e.g. called gNB) corresponds to 1 or many TRPs. Two levels of network controlled mobility: Radio Resource Control (RRC) driven at a "cell" level, and Zero/Minimum RRC involvement (e.g. at Medium Access Control (MAC)/Physical (PHY)).

Figure 15:
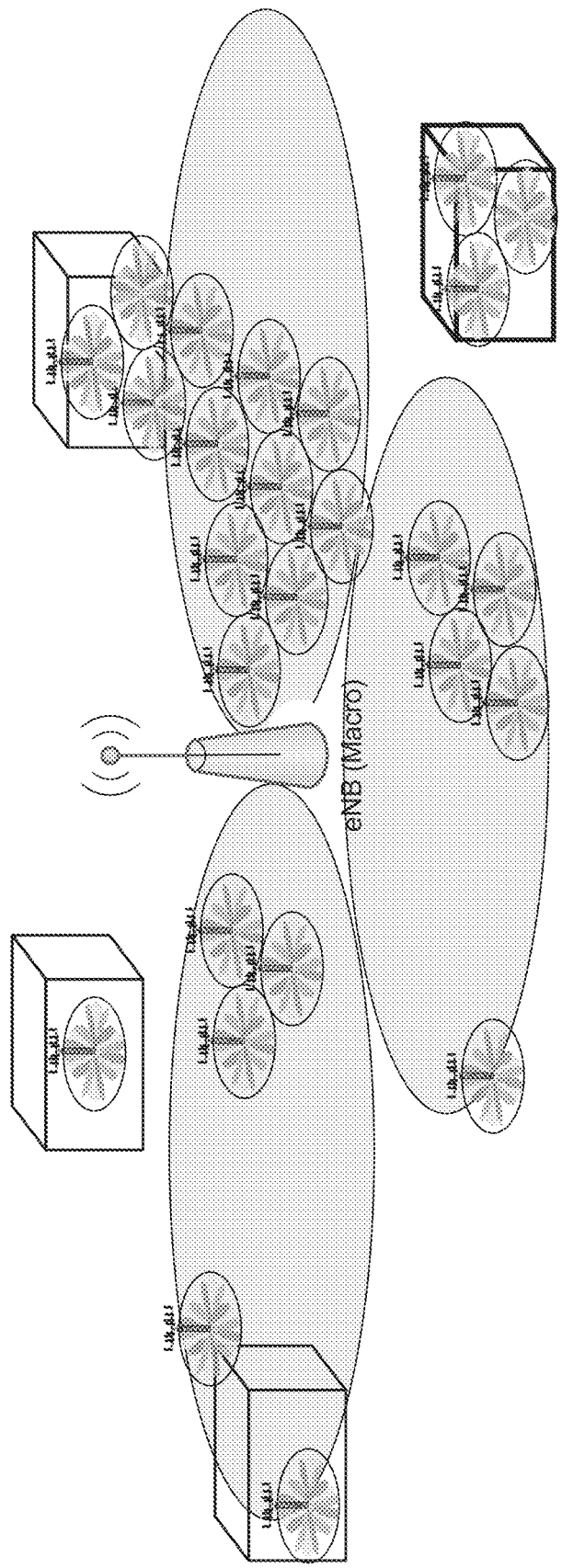
FIG. 15 illustrates different deployment scenarios with a single TRP cell as shown in 3GPP R2-163879.
Figure 16:
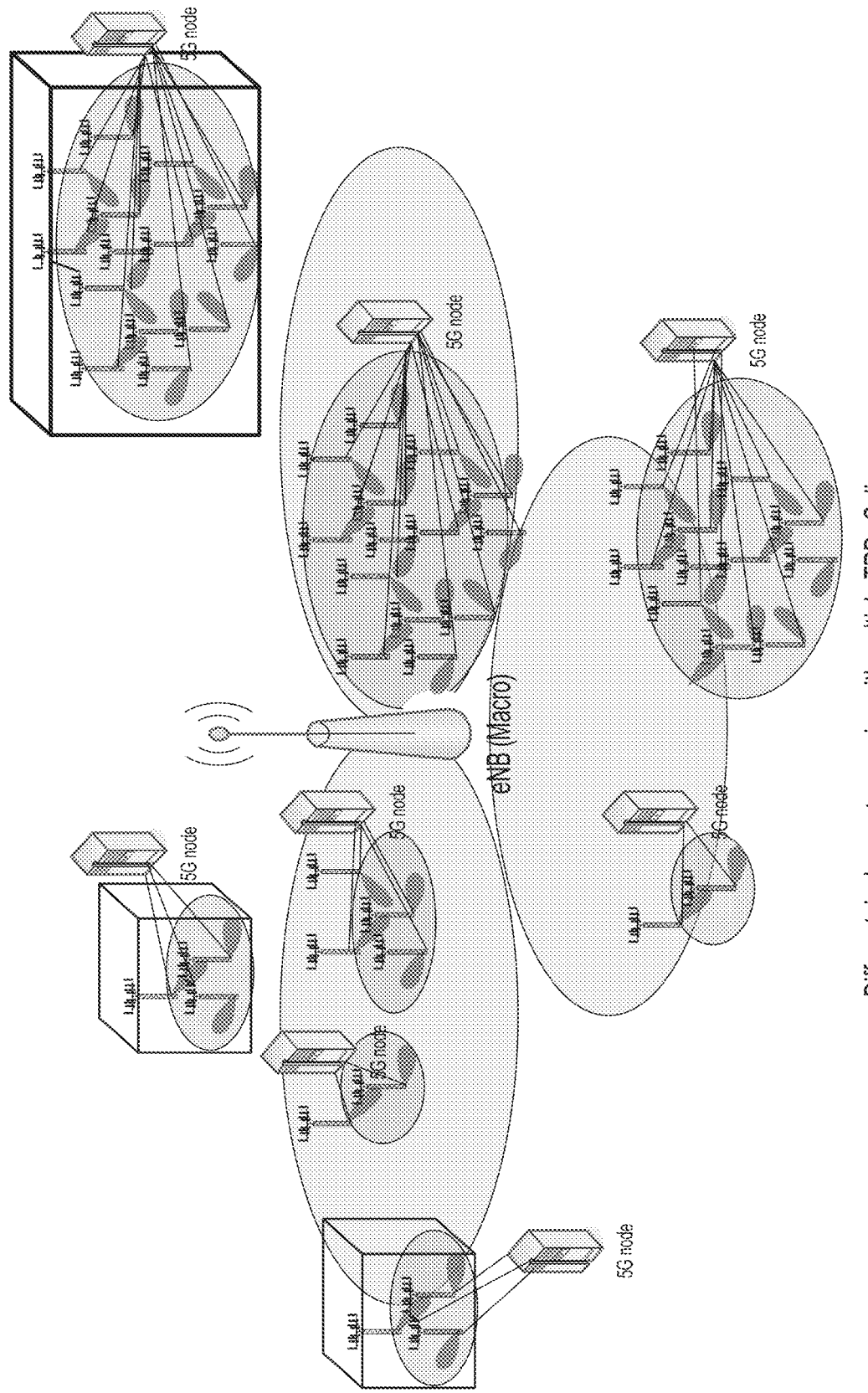
FIG. 16 illustrates different deployment scenarios with multiple TRP cells as shown in 3GPP R2-163879.
Figure 17:
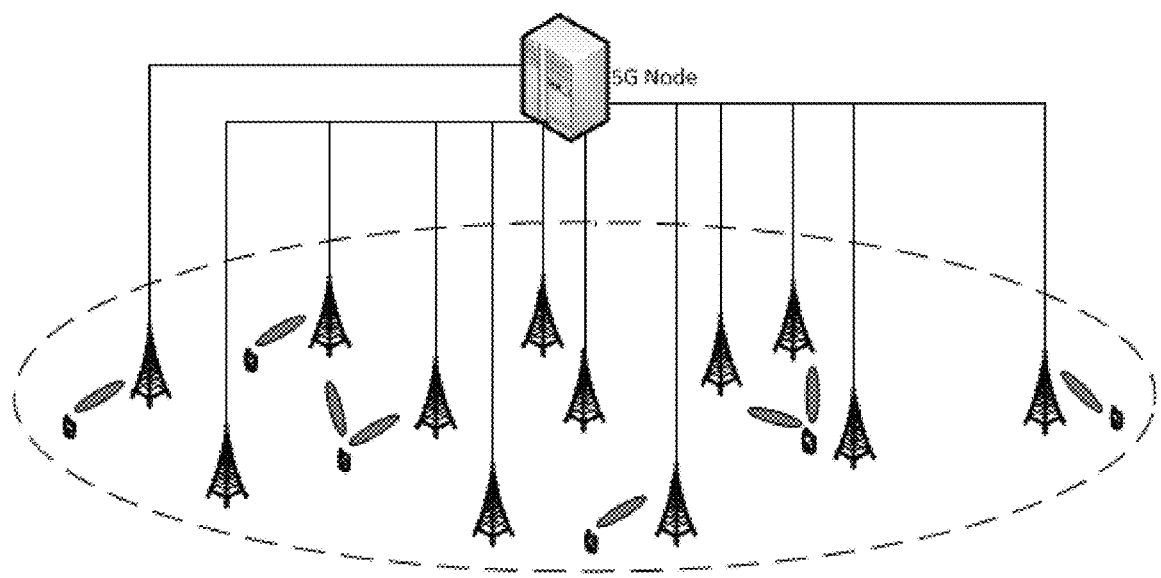
FIG. 17 illustrates one exemplary 5G cell as shown in 3GPP R2-162210.
Figure 18:
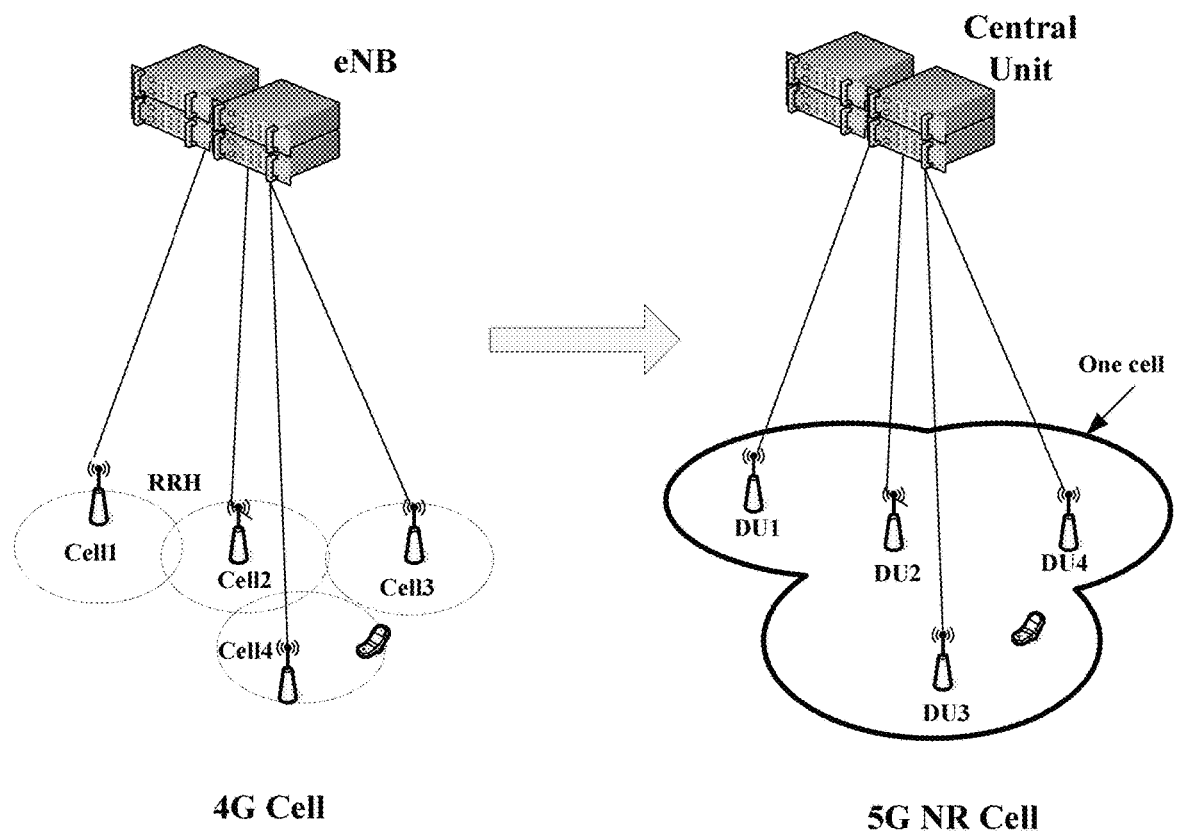
FIG. 18 illustrates one exemplary LTE cell and NR cell as shown in 3GPP R2-163471.

FIGS. 15-18 show some example of the concept of a cell in 5G NR. FIG. 15 shows a deployment with single TRP cell. FIG. 16 shows a deployment with multiple TRP cell. FIG. 17 shows one 5G cell comprising a 5G node with multiple TRPs. FIG. 18 shows a comparison between a LTE cell and a NR cell.

The background of the measurement report triggering in LTE RRC specification is described in 3GPP TS 36.331 V13.1.0 as follows:

5.5.4 Measurement Report Triggering
5.5.4.1 General
If security has been activated successfully, the UE shall:
1> for each measId included in the measIdList within VarMeasConfig:
  2> if the corresponding reportConfig includes a purpose set to reportStrongestCellsForSON:
    3> consider any neighbouring cell detected on the associated frequency to be applicable;
  2> else if the corresponding reportConfig includes a purpose set to reportCGI:
    3> consider any neighbouring cell detected on the associated frequency/set of frequencies (GERAN) which has a physical cell identity matching the value of the cellForWhichToReportCGI included in the corresponding measObject within the VarMeasConfig to be applicable;
  2> else:
    3> if the corresponding measObject concerns E-UTRA:
      4> if the ue-RxTxTimeDiffPeriodical is configured in the corresponding reportConfig:
        5> consider only the PCell to be applicable;
      4> else if the reportSSTD-Meas is set to true in the corresponding reportConfig:
        5> consider the PSCell to be applicable;
      4> else if the eventA1 or eventA2 is configured in the corresponding reportConfig:
        5> consider only the serving cell to be applicable;
      4> else if eventC1 or eventC2 is configured in the corresponding reportConfig; or if reportStrongestCSI-RSs is included in the corresponding reportConfig:
        5> consider a CSI-RS resource on the associated frequency to be applicable when the concerned CSI-RS resource is included in the measCSI-RS-ToAddModList defined within the VarMeasConfig for this measId;
      4> else if measRSSI-ReportConfig is configured in the corresponding reportConfig:
        5> consider the resource indicated by the rmtc-Config on the associated frequency to be applicable;
      4> else:
        5> if useWhiteCellList is set to TRUE:
          6> consider any neighbouring cell detected on the associated frequency to be applicable when the concerned cell is included in the whiteCellsToAddModList defined within the VarMeasConfig for this measId;
        5> else:
          6> consider any neighbouring cell detected on the associated frequency to be applicable when the concerned cell is not included in the blackCellsToAddModList defined within the VarMeasConfig for this measId;
        5> for events involving a serving cell on one frequency and neighbours on another frequency, consider the serving cell on the other frequency as a neighbouring cell;
      4> if the corresponding reportConfig includes alternativeTimeToTrigger and if the UE supports alternativeTimeToTrigger:
        5> use the value of alternativeTimeToTrigger as the time to trigger instead of the value of timeToTrigger in the corresponding reportConfig for cells included in the altTTT-CellsToAddModList of the corresponding measObject;
    3> else if the corresponding measObject concerns UTRA or CDMA2000:
      4> consider a neighbouring cell on the associated frequency to be applicable when the concerned cell is included in the cellsToAddModList defined within the VarMeasConfig for this measId (i.e. the cell is included in the white-list);
    NOTE 0: The UE may also consider a neighbouring cell on the associated UTRA frequency to be applicable when the concerned cell is included in the csg-allowedReportingCells within the VarMeasConfig for this measId, if configured in the corresponding measObjectUTRA (i.e. the cell is included in the range of physical cell identities for which reporting is allowed).
    3> else if the corresponding measObject concerns GERAN:
      4> consider a neighbouring cell on the associated set of frequencies to be applicable when the concerned cell matches the ncc-Permitted defined within the VarMeasConfig for this measId;
    3> else if the corresponding measObject concerns WLAN:
      4> consider a WLAN on the associated set of frequencies, as indicated by carrierFreq or on all WLAN frequencies when carrierFreq is not present, to be applicable if the WLAN matches all WLAN identifiers of at least one entry within wlan-Id-List for this measId;
  2> if the triggerType is set to event and if the entry condition applicable for this event, i.e. the event corresponding with the eventId of the corresponding reportConfig within VarMeasConfig, is fulfilled for one or more applicable cells for all measurements after layer 3 filtering taken during timeToTrigger defined for this event within the VarMeasConfig, while the VarMeasReportList does not include an measurement reporting entry for this measId (a first cell triggers the event):
    3> include a measurement reporting entry within the VarMeasReportList for this measId;
    3> set the numberOfReportsSent defined within the VarMeasReportList for this measId to 0;
    3> include the concerned cell(s) in the cellsTriggeredList defined within the VarMeasReportList for this measId;
    3> if the UE supports T312 and if useT312 is included for this event and if T310 is running:

4> if T312 is not running:
  5> start timer T312 with the value configured in the corresponding measObject;
3> initiate the measurement reporting procedure, as specified in 5.5.5;
2> if the triggerType is set to event and if the entry condition applicable for this event, i.e. the event corresponding with the eventId of the corresponding reportConfig within VarMeasConfig, is fulfilled for one or more applicable cells not included in the cellsTriggeredList for all measurements after layer 3 filtering taken during timeToTrigger defined for this event within the VarMeasConfig (a subsequent cell triggers the event):
  3> set the numberOfReportsSent defined within the VarMeasReportList for this measId to 0;
  3> include the concerned cell(s) in the cellsTriggeredList defined within the VarMeasReportList for this measId;
  3> if the UE supports T312 and if useT312 is included for this event and if T310 is running:
    4> if T312 is not running:
      5> start timer T312 with the value configured in the corresponding measObject;
  3> initiate the measurement reporting procedure, as specified in 5.5.5;
2> if the triggerType is set to event and if the leaving condition applicable for this event is fulfilled for one or more of the cells included in the cellsTrigeredList defined within the VarMeasReportList for this measId for all measurements after layer 3 filtering taken during timeToTrigger defined within the VarMeasConfig for this event:
  3> remove the concerned cell(s) in the cellsTrigeredList defined within the VarMeasReportList for this measId;
  3> if the UE supports T312 and if useT312 is included for this event and if T310 is running:
    4> if T312 is not running:
      5> start timer T312 with the value configured in the corresponding measObject;
  3> if reportOnLeave is set to TRUE for the corresponding reporting configuration or if a6-ReportOnLeave is set to TRUE for the corresponding reporting configuration:
    4> initiate the measurement reporting procedure, as specified in 5.5.5;
  3> if the cellsTriggeredList defined within the VarMeasReportList for this measId is empty:
    4> remove the measurement reporting entry within the VarMeasReportList for this measId;
    4> stop the periodical reporting timer for this measId, if running;
2> if the triggerType is set to event and if the entry condition applicable for this event, i.e. the event corresponding with the eventId of the corresponding reportConfig within VarMeasConfig, is fulfilled for one or more applicable CSI-RS resources for all measurements after layer 3 filtering taken during timeToTrigger defined for this event within the VarMeasConfig, while the VarMeasReportList does not include an measurement reporting entry for this measId (i.e. a first CSI-RS resource triggers the event):
  3> include a measurement reporting entry within the VarMeasReportList for this measId;
  3> set the numberOfReportsSent defined within the VarMeasReportList for this measId to 0;
  3> include the concerned CSI-RS resource(s) in the csi-RS-TriggeredList defined within the VarMeasReportList for this measId;
  3> initiate the measurement reporting procedure, as specified in 5.5.5;
2> if the triggerType is set to event and if the entry condition applicable for this event, i.e. the event corresponding with the eventId of the corresponding reportConfig within VarMeasConfig, is fulfilled for one or more applicable CSI-RS resources not included in the csi-RS-TriggeredList for all measurements after layer 3 filtering taken during timeToTrigger defined for this event within the VarMeasConfig (i.e. a subsequent CSI-RS resource triggers the event):
  3> set the numberOfReportsSent defined within the VarMeasReportList for this measId to 0;
  3> include the concerned CSI-RS resource(s) in the csi-RS-TriggeredList defined within the VarMeasReportList for this measId;
  3> initiate the measurement reporting procedure, as specified in 5.5.5;
2> if the triggerType is set to event and if the leaving condition applicable for this event is fulfilled for one or more of the CSI-RS resources included in the csi-RS-TriggeredList defined within the VarMeasReportList for this measId for all measurements after layer 3 filtering taken during timeToTrigger defined within the VarMeasConfig for this event:
  3> remove the concerned CSI-RS resource(s) in the csi-RS-TriggeredList defined within the VarMeasReportList for this measId;
  3> if c1-ReportOnLeave is set to TRUE for the corresponding reporting configuration or if c2-ReportOnLeave is set to TRUE for the corresponding reporting configuration:
    4> initiate the measurement reporting procedure, as specified in 5.5.5;
  3> if the csi-RS-TriggeredList defined within the VarMeasReportList for this measId is empty:
    4> remove the measurement reporting entry within the VarMeasReportList for this measId;
    4> stop the periodical reporting timer for this measId, if running;
2> if measRSSI-ReportConfig is included and if a (first) measurement result is available:
  3> include a measurement reporting entry within the VarMeasReportList for this measId;
  3> set the numberOfReportsSent defined within the VarMeasReportList for this measId to 0;
  3> initiate the measurement reporting procedure as specified in 5.5.5 immediately when RSSI sample values are reported by the physical layer after the first L1 measurement duration;
2> else if the purpose is included and set to reportStrongestCells or to reportStrongestCellsForSON and if a (first) measurement result is available:
  3> include a measurement reporting entry within the VarMeasReportList for this measId;
  3> set the numberOfReportsSent defined within the VarMeasReportList for this measId to 0;
  3> if the purpose is set to reportStrongestCells and reportStrongestCSI-RSs is not included:

4> if the triggerType is set to periodical and the corresponding reportConfig includes the ul-DelayConfig:
  5> initiate the measurement reporting procedure, as specified in 5.5.5, immediately after a first measurement result is provided by lower layers;
4> else if the reportAmount exceeds 1:
  5> initiate the measurement reporting procedure, as specified in 5.5.5, immediately after the quantity to be reported becomes available for the PCell;
4> else (i.e. the reportAmount is equal to 1):
  5> initiate the measurement reporting procedure, as specified in 5.5.5, immediately after the quantity to be reported becomes available for the PCell and for the strongest cell among the applicable cells, or becomes available for the pair of PCell and the PSCell in case of SSTD measurements;
3> else:
  4> initiate the measurement reporting procedure, as specified in 5.5.5, when it has determined the strongest cells on the associated frequency;
2> upon expiry of the periodical reporting timer for this measId:
  3> initiate the measurement reporting procedure, as specified in 5.5.5;
2> if the purpose is included and set to reportCGI and if the UE acquired the information needed to set all fields of cgi-Info for the requested cell:
  3> include a measurement reporting entry within the VarMeasReportList for this measId;
  3> set the numberOfReportsSent defined within the VarMeasReportList for this measId to 0;
  3> stop timer T321;
  3> initiate the measurement reporting procedure, as specified in 5.5.5;
2> upon expiry of the T321 for this measId:
  3> include a measurement reporting entry within the VarMeasReportList for this measId;
  3> set the numberOfReportsSent defined within the VarMeasReportList for this measId to 0;
  3> initiate the measurement reporting procedure, as specified in 5.5.5;
NOTE 2: The UE does not stop the periodical reporting with triggerType set to event or to periodical while the corresponding measurement is not performed due to the PCell RSRP being equal to or better than s-Measure or due to the measurement gap not being setup.
NOTE 3: If the UE is configured with DRX, the UE may delay the measurement reporting for event triggered and periodical triggered measurements until the Active Time, which is defined in TS 36.321 [6].

5.5.4.2 Event A1 (Serving Becomes Better than Threshold)

The UE shall:
1> consider the entering condition for this event to be satisfied when condition A1-1, as specified below, is fulfilled;
1> consider the leaving condition for this event to be satisfied when condition A1-2, as specified below, is fulfilled;
1> for this measurement, consider the primary or secondary cell that is configured on the frequency indicated in the associated measObjectEUTRA to be the serving cell;

| | |
|---|---|
| $Ms-Hys>Thresh$ | Inequality A1-1 (Entering condition) |
| $Ms+Hys<Thresh$ | Inequality A1-2 (Leaving condition) |

5.5.4.3 Event A2 (Serving Becomes Worse than Threshold)

The UE shall:
1> consider the entering condition for this event to be satisfied when condition A2-1, as specified below, is fulfilled;
1> consider the leaving condition for this event to be satisfied when condition A2-2, as specified below, is fulfilled;
1> for this measurement, consider the primary or secondary cell that is configured on the frequency indicated in the associated measObjectEUTRA to be the serving cell;

| | |
|---|---|
| $Ms+Hys<Thresh$ | Inequality A2-1 (Entering condition) |
| $Ms-Hys>Thresh$ | Inequality A2-2 (Leaving condition) |

5.5.4.4 Event A3 (Neighbour Becomes Offset Better than PCell/PSCell)

The UE shall:
1> consider the entering condition for this event to be satisfied when condition A3-1, as specified below, is fulfilled;
1> consider the leaving condition for this event to be satisfied when condition A3-2, as specified below, is fulfilled;
1> if usePSCell of the corresponding reportConfig is set to true:
  2> use the PSCell for Mp, Ofp and Ocp;
1> else:
  2> use the PCell for Mp, Ofp and Ocp;
NOTE The cell(s) that triggers the event is on the frequency indicated in the associated measObject which may be different from the frequency used by the PCell/PSCell.

| | |
|---|---|
| $Mn+Ofn+Ocn-Hys > Mp+Ofp+Ocp+Off$ | Inequality A3-1 (Entering condition) |
| $Mn+Ofn+Ocn+Hys < Mp+Ofp+Ocp+Off$ | Inequality A3-2 (Leaving condition) |

5.5.4.5 Event A4 (Neighbour Becomes Better than Threshold)

The UE shall:
1> consider the entering condition for this event to be satisfied when condition A4-1, as specified below, is fulfilled;
1> consider the leaving condition for this event to be satisfied when condition A4-2, as specified below, is fulfilled;

| | |
|---|---|
| $Mn+Ofn+Ocn-Hys>Thresh$ | Inequality A4-1 (Entering condition) |
| $Mn+Ofn+Ocn+Hys<Thresh$ | Inequality A4-2 (Leaving condition) |

The variables in the formula are defined as follows:

5.5.4.6 Event A5 (PCell/PSCell Becomes Worse than Threshold1 and Neighbour Becomes Better than Threshold2)

The UE shall:
1> consider the entering condition for this event to be satisfied when both condition A5-1 and condition A5-2, as specified below, are fulfilled;
1> consider the leaving condition for this event to be satisfied when condition A5-3 or condition A5-4, i.e. at least one of the two, as specified below, is fulfilled;

1> if usePSCell of the corresponding reportConfig is set to true:
  2> use the PSCell for Mp;
1> else:
  2> use the PCell for Mp;
NOTE: The cell(s) that triggers the event is on the frequency indicated in the associated measObject which may be different from the frequency used by the PCell/PSCell.

| | |
|---|---|
| *Mp+Hys*<Thresh1 | Inequality A5-1 (Entering condition 1) |
| *Mn+Ofn+Ocn−Hys*>Thresh2 | Inequality A5-2 (Entering condition 2) |
| *Mp−Hys*>Thresh1 | Inequality A5-3 (Leaving condition 1) |
| *Mn+Ofn+Ocn+Hys*<Thresh2 | Inequality A5-4 (Leaving condition 2) |

5.5.4.6a Event A6 (Neighbour Becomes Offset Better than SCell)
The UE shall:
  1> consider the entering condition for this event to be satisfied when condition A6-1, as specified below, is fulfilled;
  1> consider the leaving condition for this event to be satisfied when condition A6-2, as specified below, is fulfilled;
  1> for this measurement, consider the (secondary) cell that is configured on the frequency indicated in the associated measObjectEUTRA to be the serving cell;
NOTE: The neighbour(s) is on the same frequency as the SCell i.e. both are on the frequency indicated in the associated measObject.

| | |
|---|---|
| *Mn+Ocn−Hys*>*Ms+Ocs+Off* | Inequality A6-1 (Entering condition) |
| *Mn+Ocn+Hys*<*Ms+Ocs+Off* | Inequality A6-2 (Leaving condition) |

5.5.4.7 Event B1 (Inter RAT Neighbour Becomes Better than Threshold)
The UE shall:
  1> for UTRA and CDMA2000, only trigger the event for cells included in the corresponding measurement object;
  1> consider the entering condition for this event to be satisfied when condition B1-1, as specified below, is fulfilled;
  1> consider the leaving condition for this event to be satisfied when condition B1-2, as specified below, is fulfilled;

| | |
|---|---|
| *Mn+Ofn−Hys*>Thresh | Inequality B1-1 (Entering condition) |
| *Mn+Oft+Hys*<Thresh | Inequality B1-2 (Leaving condition) |

5.5.4.8 Event B2 (PCell Becomes Worse than Threshold) and Inter RAT Neighbour Becomes Better than Threshold2)
The UE shall:
  1> for UTRA and CDMA2000, only trigger the event for cells included in the corresponding measurement object;
  1> consider the entering condition for this event to be satisfied when both condition B2-1 and condition B2-2, as specified below, are fulfilled;
  1> consider the leaving condition for this event to be satisfied when condition B2-3 or condition B2-4, i.e. at least one of the two, as specified below, is fulfilled;

| | |
|---|---|
| *Mp+Hys*<Thresh1 | Inequality B2-1 (Entering condition 1) |
| *Mn+Ofn−Hys*>Thresh2 | Inequality B2-2 (Entering condition 2) |
| *Mp−Hys*>Thresh1 | Inequality B2-3 (Leaving condition 1) |
| *Mn+Ofn+Hys*<Thresh2 | Inequality B2-4 (Leaving condition 2) |

Beamforming procedures in the KT 5G PHY specification are described in KT 5G-SIG TS 5G.213 v1.9 as follows:
5 Beamforming Procedures
5.1 Beam Acquisition and Tracking
The downlink transmitting beams are acquired from beam reference signals. Up to 8 antenna ports are supported for beam reference signal (BRS). A UE tracks downlink transmitting beams through the periodic BRS measurements. The BRS transmission period is configured by a 2 bit indicator in xPBCH. The BRS transmission period is the necessary time to sweep the whole downlink beams transmitted via BRS. The following BRS transmission periods are supported:
  "00" Single slot (<5 ms): supportable for maximum 7 downlink transmitting beams per antenna port
  "01" Single subframe (=5 m): supportable for maximum 14 downlink transmitting beams per antenna port
  "10" Two subframe (=10 ms): supportable for maximum 28 downlink transmitting beams per antenna port
  "11" Four subframe (=20 ms): supportable for maximum 56 downlink transmitting beams per antenna port
UE maintains a candidate beam set of 4 BRS beams, where for each beam the UE records beam state information (BSI). BSI comprises beam index (BI) and beam reference signal received power (BRSRP).
UE reports BSI on PUCCH or PUSCH as indicated by 5G Node per clause 8.3. 5GNode may send BSI request in DL DCI, UL DCI, and RAR grant.
When reporting BSI on xPUCCH, UE reports BSI for a beam with the highest BRSRP in the candidate beam set.
When reporting BSI on xPUSCH, UE reports BSIs for $N \in \{1, 2, 4\}$ beams in the candidate beam set, where N is provided in the 2-bit BSI request from 5G Node. The BSI reports are sorted in decreasing order of BRSRP.
5.1.1 BRS Management
There are two beam switch procedures, which are MAC-CE based beam switch procedure and DCI based beam switch procedure associated with BRS.
For the MAC-CE based beam switch procedure [4], 5G Node transmits a MAC-CE containing a BI to the UE.
The UE shall, upon receiving the MAC-CE, switch the serving beam at the UE to match the beam indicated by the MAC-CE. The beam switching shall apply from the beginning of subframe n+kbeamswitch-delay-mac where subframe n is used for HARQ-ACK transmission associated with the MAC-CE and kbeamswitch-delay-mac=14. The UE shall assume that the 5G Node beam associated with xPDCCH, xPDSCH, CSI-RS, xPUCCH, xPUSCH, and xSRS is switched to the beam indicated by the MAC-CE from the beginning of subframe n+kbeam-switch-delay-mac.
For the DCI based beam switch procedure, 5G Node requests a BSI report via DCI and the beam_switch_indication field is set to 1 in the same DCI. The UE shall, upon receiving such a DCI, switch the serving beam at the UE to match the beam indicated by the first BI reported by the UE in the BSI report corresponding to this BSI request. The beam switching shall apply from the beginning of subframe n+kbeam-switch-delay-dic where subframe n is used for sending the BSI report and kbeam-switch-delay-dci=11.
If beam_switch_indication field=0 in the DCI the UE is not required to switch the serving beam at the UE.
For any given subframe, if there is a conflict in selecting the serving beam at the UE, the serving beam is chosen that is associated with the most recently received subframe containing the MAC-CE (for MAC-CE based procedure) or the DCI (for DCI based procedure). A UE is not expected to receive multiple requests for beam switching in the same subframe.

5.2 Beam Refinement

BRRS is triggered by DCI. A UE can also request BRRS using SR [4]. To request the serving 5G Node to transmit BRRS, the UE transmits the scheduling request preamble where the higher layer configured preamble resource {u,v,f', and NSR} is dedicated for beam refinement reference signal initiation request.

The time and frequency resources that can be used by the UE to report Beam Refinement Information (BRI), which consists of BRRS Resource Index (BRRS-RI) and BRRS reference power (BRRS-RP), are controlled by the 5G Node. A UE can be configured with 4 Beam Refinement (BR) processes by higher layers. A 2-bit resource allocation field and a 2 bit process indication field in the DCI are described in Table 5.2-1 and Table 5.2-2, respectively.

FIG. 5 (reproduction of Table 5.2-1 from KT 5G-SIG TS 5G.213 v1.9).

FIG. 6 (reproduction of Table 5.2-2 from KT 5G-SIG TS 5G.213 v1.9).

A BR process comprises of up to eight BRRS resources, a resource allocation type and a VCID, and is configured via RRC signalling. A BRRS resource comprises of a set of antenna ports to be measured.

FIG. 7 (reproduction of Table 5.2-3 from KT 5G-SIG TS 5G.213 v1.9).

A BRRS transmission can span 1, 2, 5 or 10 OFDM symbols, and is associated with a BRRS resource allocation, BRRS process indication, and a BR process configuration as in Table 5.2-1, 5.2.-2 and 5.2.-3. A BRI reported by the UE corresponds to one BR process that is associated with up to eight BRRS resources. The UE shall assume that BRRS mapped to the BRRS resource ID 0 in each BRRS process is transmitted by the serving beam.

5.2.1 BRRS Management

There are two beam switch procedures, which are MAC-CE based beam switch procedure and DCI based beam switch procedure associated with BRRS.

For the MAC-CE based beam switch procedure [4], 5G Node transmits a MAC-CE containing a BRRS resource ID and the associated BR process ID to the UE.

The UE shall, upon receiving the MAC-CE, switch the serving beam at the UE to match the beam indicated by the MAC-CE. The beam switching shall apply from the beginning of subframe n+kbeamswitch-delay-mac where subframe n is used for HARQ-ACK transmission associated with the MAC-CE and kbeamswitch-delay-mac=14. The UE shall assume that the 5G Node beam associated with xPDCCH, xPDSCH, CSI-RS, xPUCCH, xPUSCH, and xSRS is switched to the beam indicated by the MAC-CE from the beginning of subframe n+kbeam-switch-delay-mac.

For the DCI based beam switch procedure, 5G Node requests a BRI report via DCI and the beam_switch_indication field is set to 1 in the same DCI. The UE shall, upon receiving such a DCI, switch the serving beam at the UE to match the beam indicated by the first BRRS-RI reported by the UE in the BRI report corresponding to this BRI request. The beam switching shall apply from the beginning of subframe n+kbeam-switch-delay-dic where subframe n is used for sending the BRI report and kbeam-switch-delay-dci=11.

If beam_switch_indication field=0 in the DCI the UE is not required to switch the serving beam at the UE.

For any given subframe, if there is a conflict in selecting the serving beam at the UE, the serving beam is chosen that is associated with the most recently received subframe containing the MAC-CE (for MAC-CE based procedure) or the DCI (for DCI based procedure). A UE is not expected to receive multiple requests for beam switching in the same subframe.

5.3 Beam Recovery

If a UE detects the current serving beam is misaligned [4] and has BSIs for beam recovery, the UE shall perform beam recovery process.

In the UL synchronized UE case, the UE transmits scheduling request by scheduling request preamble where the preamble resource {u, v, f' and $N_{SR}$} is dedicated for beam recovery as configured by higher layers. Upon the reception of this request, 5G Node may initiate BSI reporting procedure as described in section 8.3.

In UL asynchronized UE case, the UE transmits random access preamble for contention based random access. If the UE is scheduled by RAR triggering BSI reporting, the UE reports N BSIs in Msg3 as UCI multiplexing in [3].

8.3 UE Procedure for Reporting Beam State Information (BSI)

UE reports BSI on xPUCCH or xPUSCH as indicated by 5G Node. 5G Node can send BSI request in DL DCI, UL DCI, and RAR grant.

If a UE receives BSI request in DL DCI, the UE reports a BSI on xPUCCH. The time/frequency resource for xPUCCH is indicated in the DL DCI. When reporting BSI on xPUCCH, UE reports a BSI for a beam with the highest BRSRP in the candidate beam set.

If UE receives BSI request in UL DCI or in RAR grant, UE reports BSIs on xPUSCH. The time/frequency resource for xPUSCH is indicated in the UL DCI or RAR grant that requests BSI report. When reporting BSI on xPUSCH, UE reports BSI for N∈{1, 2, 4} beams with the highest BRSRP in the candidate beam set, where N is provided in the DCI.

If BSI reporting is indicated on both xPUCCH and xPUSCH in the same subframe, UE reports BSI on xPUSCH only and discards the xPUCCH trigger.

8.3.1 BSI Reporting Using xPUSCH

Upon decoding in subframe n an UL DCI with a BSI request, UE shall report BSI using xPUSCH in subframe n+4+m+l, where parameters m=0 and l={0, 1, . . . 7} is indicated by the UL DCI.

The number of BSIs to report, N∈{1, 2, 4}, is indicated in UL DCI.

A UE shall report N BSIs corresponding to N beams in the candidate beam set.

A BSI report contains N BIs and corresponding BRSRPs. A UE shall report wideband BRSRPs.

A UE is not expected to receive more than one request for BSI reporting on xPUSCH for a given subframe.

8.3.2 BSI Reporting Using xPUCCH

Upon decoding in subframe n a DL DCI with a BSI request, UE shall report BSI using xPUCCH subframe index n+4+ m+k, where parameters m=0 and k={0, 1, . . . 7} is indicated by the DL DCI.

When reporting BSI on xPUCCH, UE reports BSI for a beam with the highest BRSRP in the candidate beam set.

A BSI report contains BI and corresponding BRSRP. A UE shall report wideband BRSRP.

A UE is not expected to receive more than one request for BSI reporting on xPUCCH for a given subframe.

8.3.3 BSI Definition
8.3.3.1 BRSRP Definition

The BRSRP indices and their interpretations are given in Table 8.3.3.1-1. The reporting range of BRSRP is defined from −140 dBm to −44 dBm with 1 dB resolution as shown in Table 8.3.3.1-1.

The UE shall derive BRSRP values from the beam measurements based on BRS defined in 5G.211. The UE shall derive BRSRP index from the measured BRSRP value. Each BRSRP index is mapped to its corresponding binary representation using 7 bits.

FIG. 8 (reproduction of Table 8.3.3.1-1 from KT 5G-SIG TS 5G.213 v1.9).

8.3.3.2 Beam Index Definition

BI indicates a selected beam index. The BI is the logical beam index associated with antenna port, OFDM symbol index and BRS transmission period [2], which is indicated by 9 bits.

8.4 UE Procedure for Reporting Beam Refinement Information (BRI)
8.4.1 BRI Reporting Using xPUSCH If the uplink DCI in subframe n indicates a BRRS transmission, the BRRS is allocated in subframe n+m where m={0, 1, 2, 3} is indicated by a 2 bit RS allocation timing in the DCI.

A BRI report is associated with one BR process that is indicated in the uplink DCI for the UE. Upon decoding in subframe n an UL DCI with a BRI request, the UE shall report BRI using xPUSCH in subframe n+4+m+l, where parameters m={0, 1, 2, 3} and l={0, 1, . . . 7} are indicated by the UL DCI.

A UE shall report wideband BRRS-RP values and BRRS-RI values corresponding to the best NBRRS BRRS resource ID where NBRRS is configured by higher layers If the number of configured BRRS resource ID associated with the BR process is less than or equal to NBRRS then the UE shall report BRRS-RP and BRRS-RI corresponding to all the configured BRRS resources.

A UE is not expected to receive more than one BRI report request for a given subframe.

8.4.2 BRI Reporting Using xPUCCH

If the DL DCI in subframe n indicates a BRRS transmission, the BRRS is allocated in subframe n+m where m={0, 1, 2, 3} is indicated by the DL DCI.

A BRI report is associated with one BRRS process that is indicated in the downlink DCI for the UE. Upon decoding in subframe n a DL DCI with a BRI request, the UE shall report BRI using xPUCCH in subframe n+4+m+k, where parameters m={0, 1, 2, 3} and k={0, 1, . . . 7} are indicated by the DL DCI.

A UE shall report a wideband BRRS-RP value and a BRRS-RI value corresponding to the best BRRS resource ID.

A UE is not expected to receive more than one BRI report request for a given subframe.

8.4.3.1 BRRS-RP Definition

The reporting range of BRRS-RP is defined from −140 dBm to −44 dBm with 1 dB resolution.

The mapping of BRRS-RP to 7 bits is defined in Table 8.4.3.1-1. Each BRRS-RP index is mapped to its corresponding binary representation using 7 bits.

FIG. 9 (reproduction of Table 8.4.3.1-1 from KT 5G-SIG TS 5G.213 v1.9).

8.4.3.2 BRRS-RI Definition

BRRS-RI indicates a selected BRRS resource ID. A BR process may comprise of a maximum of 8 BRRS resource IDs. The selected BRRS resource ID is indicated by 3 bits as in Table 8.4.3.2-1.

FIG. 10 (reproduction of Table 8.4.3.2-1 from KT 5G-SIG TS 5G.213 v1.9).

Beam management and beam related 5G MAC control element as disclosed in KT 5G MAC specification are described in KT 5G-SIG TS 5G.321 v1.2:

5.5 Beam Management
5.5.1 Beam Feedback Procedure

The beam feedback procedure is used to report beam measurement results to the serving cell. There are two beam feedback procedures defined one based on measurement of beam reference signal (BRS), beam state information reporting below, and one based on measurement of beam refinement reference signal (BRRS), beam refinement information reporting below.

5.5.1.1 Beam State Information Reporting

The BRS-based beam state information (BSI) reports initiated by xPDCCH order are transmitted through UCI on xPUCCH/xPUSCH as scheduled by the corresponding DCI [1]; event triggered BSI reports are transmitted through BSI Feedback MAC Control Element defined in subclause 6.1.3.11 using normal SR or contention-based RACH procedure, where BSI consists of Beam Index (BI) and beam reference signal received power (BRSRP). BSI reports are based on BRS transmitted by the serving cell.

5.5.1.1.1 BSI Reporting Initiated by xPDCCH Order

The BSI reports initiated by xPDCCH order are based on the latest measurement results obtained from the 5G physical layer.

if an xPDCCH order which requests BSI reporting through UCI via xPUCCH by serving cell is received in this TTI:
        if the serving beam is not the best beam and the BRSRP of the best beam is higher than BRSRP of the serving beam:
            instruct the 5G physical layer to signal the best beam on the scheduled UCI resource via xPUCCH as defined in [1];
        else:
            instruct the 5G physical layer to signal the serving beam on the scheduled UCI resource via xPUCCH as defined in [1];
    if an xPDCCH order which requests BSI reporting through UCI via xPUSCH by serving cell is received in this TTI:
        if the number of BSI for reports requested equals to 1:
            if the serving beam is not the best beam and the BRSRP of the best beam is higher than BRSRP of the serving beam:
                instruct the 5G physical layer to signal the best beam on the scheduled UCI resource via xPUSCH as defined in [1];
            else:
                instruct the 5G physical layer to signal the serving beam on the scheduled UCI resource via xPUSCH as defined in [1];
        else if the number of BSI reports requested is higher than 1 and:
            if the serving beam is not the best beam and the BRSRP of the best beam is higher than BRSRP of the serving beam:
                instruct the 5G physical layer to signal N BSIs report with the best beam as the first BSI and the next N−1 highest BRSRP beam values on the scheduled UCI resource via xPUSCH;
else:
  instruct the 5G physical layer to signal N BSIs report with the serving beam as the first BSI and the next N−1 highest BRSRP beam values on the scheduled UCI resource via xPUSCH;

5.5.1.1.2 BSI Reporting Initiated by 5G-MAC

The BSI reports initiated by 5G-MAC are based on an event trigger.
  if the BRSRP of the best beam is higher than beamTriggeringRSRPoffset dB+the BRSRP of the serving beam and:
    if the UE is uplink synchoronized (i.e., timeAlignment-Timer is not expired)
      UE transmits BSI Feedback MAC Control Element on the UL resource granted through normal SR procedure;
    else:
      UE transmits BSI Feedback MAC Control Element on the UL resource for Msg3 granted through contention-based random access procedure;

5.5.1.2 Beam Refinement Information Reporting

The beam refinement information (BRI) reports are initiated by xPDCCH order and reported through UCI on xPUCCH/xPUSCH are scheduled by the corresponding DCI[1] where BRI consists of a Refined Beam Index (RBI) and a BRSRP which are based on BRRS transmitted by the serving cell.
  if an xPDCCH order which requests BRI report through UCI via xPUCCH by serving cell is received:
    instruct the 5G physical layer to signal BRI report on the scheduled UCI resource via xPUCCH, as defined in [1];
  else if an xPDCCH order which requests BRI reporting through UCI via xPUSCH by serving cell is received:
    instruct the 5G physical layer to signal BRI report on the scheduled UCI resource via xPUSCH as defined in [1].

NOTE: event-triggered BRI feedback is not supported.
NOTE: BSI/BRI feedback requested by xPDCCH order do not affect on the 5G-MAC layer reporting procedures.

5.5.2 Beam Change Procedure

The beam change procedure is used by the serving cell to change the serving beam for the UE. The serving cell initiates the procedure by xPDCCH order, by BRS Beam Change Indication MAC Control Element, or by BRRS Beam Change Indication MAC Control Element.
For each TTI, the 5G-MAC entity shall:
  if the beam_change has been indicated by xPDCCH order for this TTI:
    if the previously transmitted report was a BRI report according to 5.5.1.2:
      instruct the 5G physical layer to change the serving beam to the beam corresponding to the RBI that had the highest BRSRP value reported after the time kbeamswitch-delay-dci defined in [1];
    else if the previously transmitted report was a BSI report according to 5.5.1.1:
      instruct the 5G physical layer to change the serving beam to the beam corresponding to the BI that had the highest BRSRP value reported after the time kbeamswitch-delay-dci defined in [1].
  if a BRS Beam Change Indication MAC Control Element as defined in 6.1.3.9 has been received in this TTI:
    instruct the 5G physical layer to change the serving beam to the beam corresponding to the BI explicitly signalled after the time kbeamswitch-delay-mac defined in [1].
  if a BRRS Beam Change Indication MAC Control Element as defined in 6.1.3.10 has been received in this TTI:
    instruct the 5G physical layer to change the serving beam to the beam corresponding to the RBI explicitly signalled after the time kbeamswitch-delay-mac defined in [1].

5.5.3 Beam Adjustment Request Procedure

If configured, the Beam Adjustment Request (BAR) is used to request the serving cell to transmit BRRS (Beam Refinement Reference Signal). UE measures the BRRS in the scheduled subframe(s) to determine the best beam of the serving cell.
5G-RRC controls the BAR by configuring the timer prohibitBAR-Timer, which limits the interval between two consecutive BARs.
NOTE: UE can trigger BAR based on any UE implementation specific conditions.
A BAR shall be triggered if prohibitBAR-Timer is not running and any UE implementation specific condition is met.
If the BAR procedure determines that a BAR has been triggered:
  if the 5G-MAC entity has UL resources allocated for new transmission for this TTI
    instruct the Multiplexing and Assembly procedure to generate and transmit a BAR MAC control element as defined in 6.1.3.8
    start or restart the prohibitBAR-Timer
  else if a dedicated SR for BRRS Request is configured to the UE
    instruct the 5G physical layer to signal the dedicated SR for BRRS request in the 5G SR region of the RACH subframe
    start or restart the prohibitBAR-Timer
  else
    a Scheduling Request shall be triggered.

6.1.3 5G-MAC Control Elements 6.1.3.11 BSI Feedback MAC Control Element

The Beam State Information (BSI) Feedback MAC control element is identified by a 5G-MAC PDU subheader with LCID as specified in table 6.2.1-2. It consists of 4 BSI fields, corresponding to 4 beams. The field BSI is defined as follows:
  BI (9-bit): this field indicates the beam index;
  BRSRP (7-bit): this field indicates the beam reference signal received power of the beam.

The BSI Feedback MAC control element is defined as follows (FIG. 6.1.3.11-1).

Figure 11:
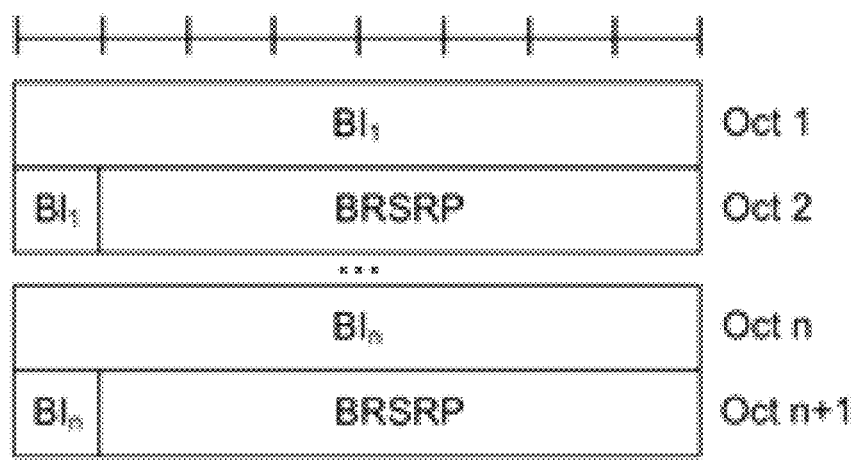
FIG. 11 is a reproduction of FIG. 6.1.3.11-1 from KT 5G-SIG TS 5G.213 v1.9 illustrating BSI Feedback MAC control element.

FIG. 11 (reproduction of Table 6.1.3.11-1 from KT 5G-SIG TS 5G.321 v1.2).

The following terminology may be used hereafter in the detailed description:
  BS: a network central unit or a network node in NR which is used to control one or multiple TRPs which are associated with one or multiple cells. Communication between BS and TRP(s) is via fronthaul. BS could also be referred to as central unit (CU), eNB, gNB, or NodeB.
  TRP: a transmission and reception point provides network coverage and directly communicates with UEs. TRP could also be referred to as distributed unit (DU) or network node.

Cell: a cell is composed of one or multiple associated TRPs, i.e. coverage of the cell is composed of coverage of all associated TRP(s). One cell is controlled by one BS. A cell could also be referred to as a TRP group (TRPG).

Beam sweeping: in order to cover all possible directions for transmission and/or reception, a number of beams is required. Since it is not possible to generate all these beams concurrently, beam sweeping means to generate a subset of these beams in one time interval and change generated beam(s) in other time interval(s), i.e. changing beam in time domain. So, all possible directions can be covered after several time intervals.

Beam sweeping number: necessary number of time interval(s) to sweep beams in all possible directions once for transmission and/or reception. In other words, a signaling applying beam sweeping would be transmitted "beam sweeping number" of times within one time period, e.g. the signaling is transmitted in (at least partially) different beam(s) in different times of the time period.

Serving beam: serving beam for a UE is a beam generated by a network node, e.g. TRP, which is currently used to communicate with the UE, e.g. for transmission and/or reception.

Candidate beam: candidate beam for a UE is a candidate of a serving beam. Serving beam may or may not be candidate beam.

Qualified beam: qualified beam is a beam with radio quality, based on measuring signal on the beam, better than a threshold.

The best serving beam: The serving beam with the best quality (e.g. the highest Beam Reference Signal Received Power (BRSRP) value).

The worst serving beam: The serving beam with the worst quality (e.g. the worst BRSRP value).

Figure 19:
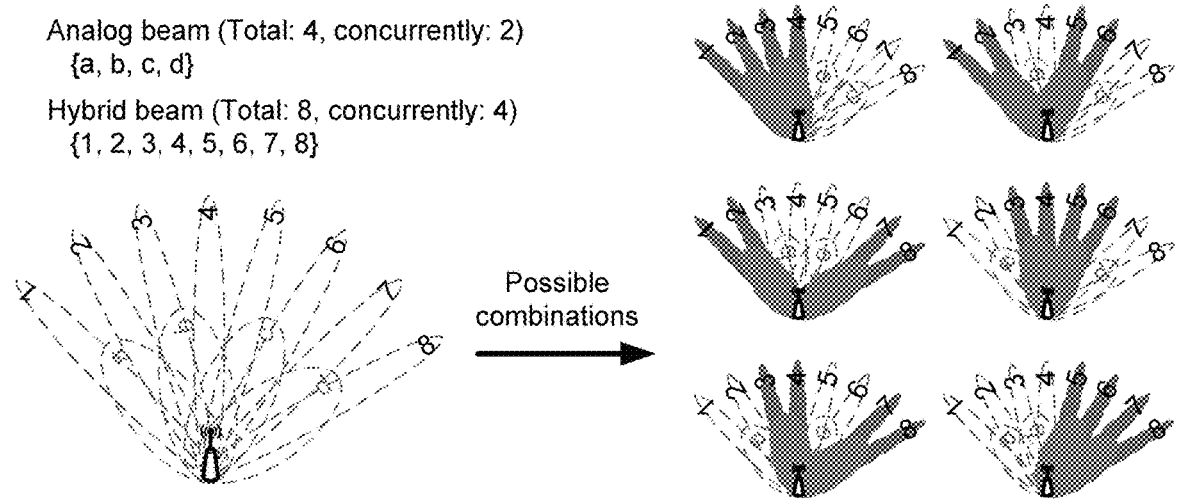
FIG. 19 illustrates one example for a combination limitation of beam generation.

The following assumptions for network side may be used hereafter in the detailed description:

NR using beamforming could be standalone, i.e. UE can directly camp on or connect to NR.
  NR using beamforming and NR not using beamforming could coexist, e.g. in different cells.
TRP would apply beamforming to both data and control signaling transmissions and receptions, if possible and beneficial.
  Number of beams generated concurrently by TRP depends on TRP capability, e.g. maximum number of beams generated concurrently by different TRPs may be different.
  Beam sweeping is necessary, e.g. for the control signaling to be provided in every direction.
  (For hybrid beamforming) TRP may not support all beam combinations, e.g. some beams could not be generated concurrently. FIG. 19 shows an example for combination limitation of beam generation.
Downlink timing of TRPs in the same cell are synchronized.
RRC layer of network side is in a Base Station (BS).
TRP should support both UEs with UE beamforming and UEs without UE beamforming, e.g. due to different UE capabilities or UE releases.

The following assumptions for UE side may be used hereafter in the detailed description:

UE may perform beamforming for reception and/or transmission, if possible and beneficial.
  Number of beams generated concurrently by UE depends on UE capability, e.g. generating more than one beam is possible.
  Beam(s) generated by UE is wider than beam(s) generated by TRP, gNB, or eNB.
  Beam sweeping for transmission and/or reception is generally not necessary for user data but may be necessary for other signaling, e.g. to perform measurement.
  (For hybrid beamforming) UE may not support all beam combinations, e.g. some beams could not be generated concurrently. FIG. 19 shows an example for combination limitation of beam generation.
Not every UE supports UE beamforming, e.g. due to UE capability or UE beamforming is not supported in NR first (few) release(s).
One UE is possible to generate multiple UE beams concurrently and to be served by multiple serving beams from one or multiple TRPs of the same cell.
  Same or different (downlink (DL) or uplink (UL)) data could be transmitted on the same radio resource via different beams for diversity or throughput gain.
There are at least two UE (RRC) states: connected state (or called active state) and non-connected state (or called inactive state or idle state). Inactive state may be an additional state or belong to connected state or non-connected state.

Figure 20:
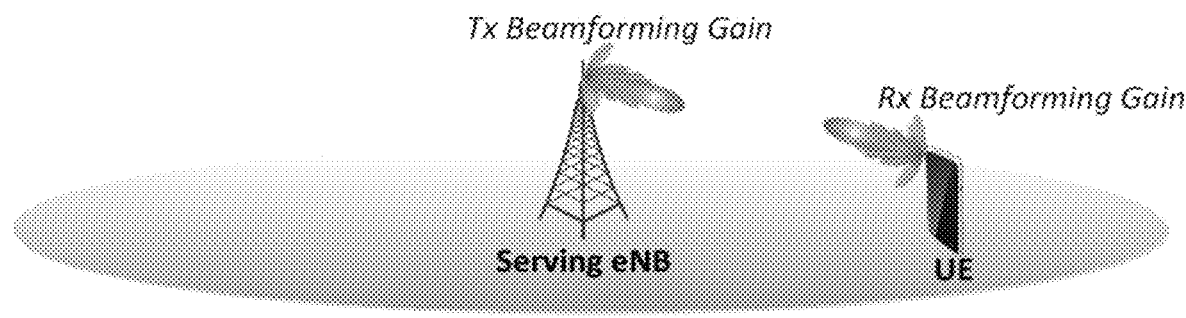
FIG. 20 illustrates gain compensation by beamforming in HF-NR system as shown in 3GPP R2-162251.

Based on 3GPP R2-162251, to use beamforming in both eNB and UE sides, practically, antenna gain by beamforming in eNB is considered about 15 to 30 dBi and the antenna gain of UE is considered about 3 to 20 dBi. FIG. 20 (quoted from 3GPP R2-162251) illustrates gain compensation by beamforming.

Figure 21:
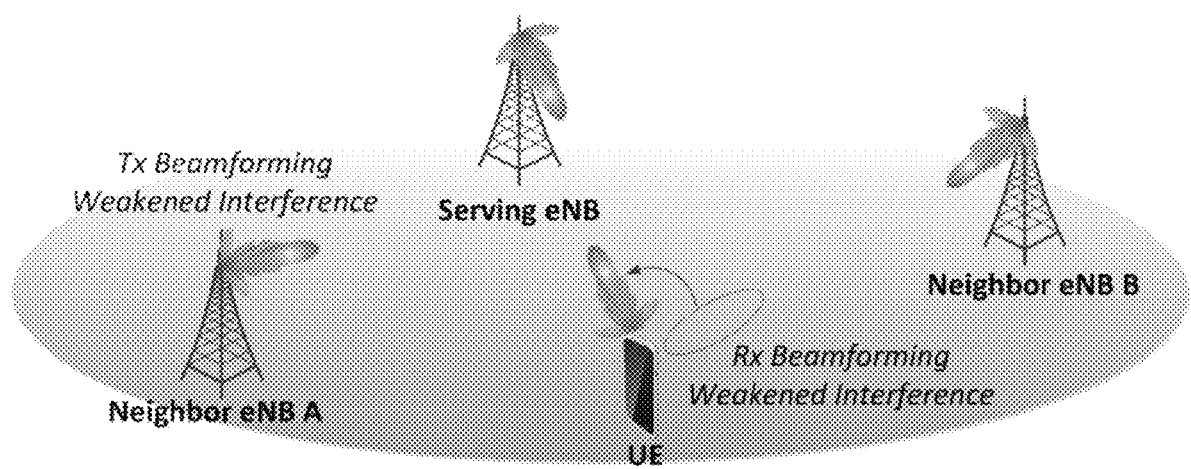
FIG. 21 illustrates weakened interference by beamforming in HF-NR system as shown in 3GPP R2-162251.

From a SINR perspective, sharp beamforming reduces interference power from neighbor interferers, i.e. neighbor eNBs in downlink case or other UEs connected to neighbor eNBs. In Transmission (TX) beamforming case, only interference from other TXs whose current beam points the same direction to the Reception (RX) will be the "effective" interference. The "effective" interference means that the interference power is higher than the effective noise power. In a RX beamforming case, only interference from other TXs whose beam direction is the same to the UE's current RX beam direction will be the effective interference. FIG. 21 (quoted from 3GPP R2-162251) illustrates weakened interference by beamforming.

According to KT 5G-SIG TS 5G.213 v1.9, TS 5G.321 v1.2, TS 5G.211 v2.6, and TS 5G.212 v2.3, two mechanisms to initiate the Beam Reference Signal (BRS)-based beam state information (BSI) report are specified, one is initiated by xPDCCH from a network node, and the other is event triggered by a UE itself. The BSI report informs the network node about the beam state information and to determine whether to add, change, or release the serving beam(s) of the UE to increase the robustness of the transmission. Basically, the event-triggered BSI reporting procedure is that the UE has to measure beam reference signal, and then the UE decides whether to report the measurement results to the network node by itself according to some triggered events. However, the event-triggered BSI reporting procedure in KT 5G-SIG TS 5G.213 v1.9, TS 5G.321 v1.2, TS 5G.211 v2.6, and TS 5G.212 v2.3 is only concerned with single serving beam. In a cell comprising multiple TRPs, it is possible that the UE is served by more than one TRP within the cell. In other words, the UE could support multiple serving beams from multiple TRPs. Therefore, the events to trigger BSI reporting for the case of the UE with multiple serving beams should be considered. Several methods are depicted below.

When a UE measures a BRS signal, the UE could know the beam index and the quality of beam, e.g. beam reference signal received power (BRSRP). Hence, the triggering events could be based on BRSRP. It is assumed that the UE has multiple serving beams from multiple TRPs, and the UE measures the BRS of all of the serving beams and/or some of the non-serving beams to derive BRSRP of these beam(s). If one of the following conditions is fulfilled, the UE may trigger BSI reporting.

The lowest value of BRSRPs of the serving beams (i.e. the worst serving beam) is lower than a first threshold.
  The first threshold may be the value of minimum BRSRP for a qualified beam.
  If the lowest value of BRSRP of the serving beam is lower than a threshold, which means this serving beam is not qualified for transmission. In this situation, the UE may have to change or release this worst serving beam and hence triggering BSI report may be needed.
The highest value of BRSRPs of the serving beams (i.e. the best serving beam) is lower than a second threshold.
  The second threshold may be a summation of the value of minimum BRSRP for a qualified beam and a positive offset.
  It means that the UE may close to have no any qualified serving beam for transmission, so triggering BSI report is required to let the network node add new qualified beam or change the serving beam for the UE if there are qualified beams being detected. Otherwise, the Beam Adjustment Request (BAR) may be initiated to request the network node to transmit BRRS (Beam Refinement Reference Signal) so that the UE can measure the BRRS in the scheduled subframe(s) to determine the best beam of the serving cell.
The average value of BRSRPs of the serving beams is lower than a third threshold.
  The meaning of the third threshold is to represent the radio condition of the UE using serving beam(s).
  The concerned serving beams may include all the serving beams.
  The concerned serving beams may include part of the serving beams (e.g. n-best beams or n-worst beams)
  If the condition is fulfilled, it represents the radio condition of the UE by using these serving beams may be not good enough for transmission, hence it is needed to change serving beams.
The value of BRSRP of a non-serving beam is higher than a first threshold.
  The first threshold may be the value of minimum BRSRP for a qualified beam.
  If the condition is fulfilled, it means this non-serving beam is qualified for transmission. In this situation, the UE can initiate BSI report so that the network may add this non-serving beam to serve the UE.
The value of BRSRP of a non-serving beam is higher than a fourth threshold.
  The fourth threshold may be the lowest value of BRSRPs of the serving beams (i.e. the worst serving beam), since the quality of the non-serving beam is better than the worst serving beam, the worst serving beam could be replaced.
  The fourth threshold may be the highest value of BRSRPs of the serving beams (i.e. the best serving beam), which means the quality of non-serving beam is better than all the serving beams. So, the serving beam(s) could be changed.

Alternatively, all the thresholds mentioned above may be configured by RRC, or indicated by PHY or MAC signaling.

Alternatively, all the thresholds mentioned above may be dynamically or semi-statistically changed.

Alternatively, all the thresholds mentioned above could add an offset which may be a positive or negative value.

Alternatively, all conditions of the thresholds mentioned above could be combined to make a new threshold.

Other conditions are listed below.

Periodically triggering
  The UE may transmit the BSI report on periodic UL resource which is configured by RRC.
  The UE may have a mechanism (e.g. a timer or counter) to report BSI periodically in order to permit the network node to track the condition of the serving beams of the UE.
If a serving beam is misaligned or not detected
  The meaning of misaligned or not detected may be that the UE could not receive the BRS from the serving beam or the value of the BRSRP of the serving beam is lower than a threshold.
  If the UE detects that any serving beam is misaligned or not detected, the BSI report needs to be transmitted for alignment. The BSI report could be transmitted via another serving beam which is still aligned.
  It could be used to implicitly inform the network node that the serving beam(s) of the UE is misaligned or not detected.
  If the serving beam is misaligned or not detected, it may have to be released or changed.
If a serving beam is added, changed, or released
  After the network node indicates the UE to add, change, or release serving beam(s), the UE could feedback the radio condition of serving beams after the indication. In other words, BSI report may be triggered by the UE.
If a beam from a new network node (e.g. TRP) is detected
  Since the UE may need more resource or more serving beams for transmission and/or reception, it is beneficial for the UE to send a BSI report so that the new beam from the network node could be added as a serving beam for the UE.

Additionally, it is not precluded that combinations from more than one of the conditions listed above may trigger BSI report. Some examples of the combinations are listed as follows:
  The lowest value of BRSRP of the serving beam is lower than threshold1 and the value of BRSRP of a non-serving beam is higher than threshold2.
  The highest value of BRSRP of the serving beam is lower than threshold1 and the value of BRSRP of a non-serving beam is higher than threshold2.
  The average of BRSRP of the serving beams is lower than threshold1 and the value of BRSRP of a non-serving beam is higher than threshold2.
  If a serving beam is misaligned and the value of BRSRP of a non-serving beam is higher than a threshold.
  If a serving beam is added, changed, or released, and the value of BRSRP of a non-serving beam is higher than a threshold.
  If a serving beam is not detected and the value of BRSRP of a non-serving beam is higher than a threshold.

The network node could be a TRP, a gNB, or a 5G node.

The above-disclosed conditions may be used to trigger beam refinement information (BRI) report.

BSI and BRI include measurement result(s) for the beam(s).

In the case that a UE maintains multiple serving beams in a cell (e.g. there are multiple TRPs in the cell), it is possible for the UE to detects that some serving beam(s) is not detected (or misaligned) while the other serving beam(s) are still detected (or aligned). The case may be called "partial serving beam misalignment". For example, the UE may detect beam misalignment for one TRP while at least one serving beam from another TRP is still aligned. In this situation, the beam(s) which needs to be recovered is for one TRP (and not for another TRP).

In this case, the UE could indicate the partial serving beam misalignment to the network via one or more serving beams which are still aligned. A signaling for indicating partial beam misalignment may be a SR preamble, a beam adjustment request (BAR), a beam state information (BSI) report, a beam refinement information (BRI) report, or a random access preamble. The network may transmit a beam change indication to change some of the serving beams in response to the partial serving beam misalignment indication.

In one example, a UE is served by a first beam and a second beam of a cell, and then the UE finds that the first beam is not detected. If the second beam is still valid, the UE could indicate the status of the first beam (e.g. the first beam should be released from the serving beams) to the network via the second beam.

Figure 22:
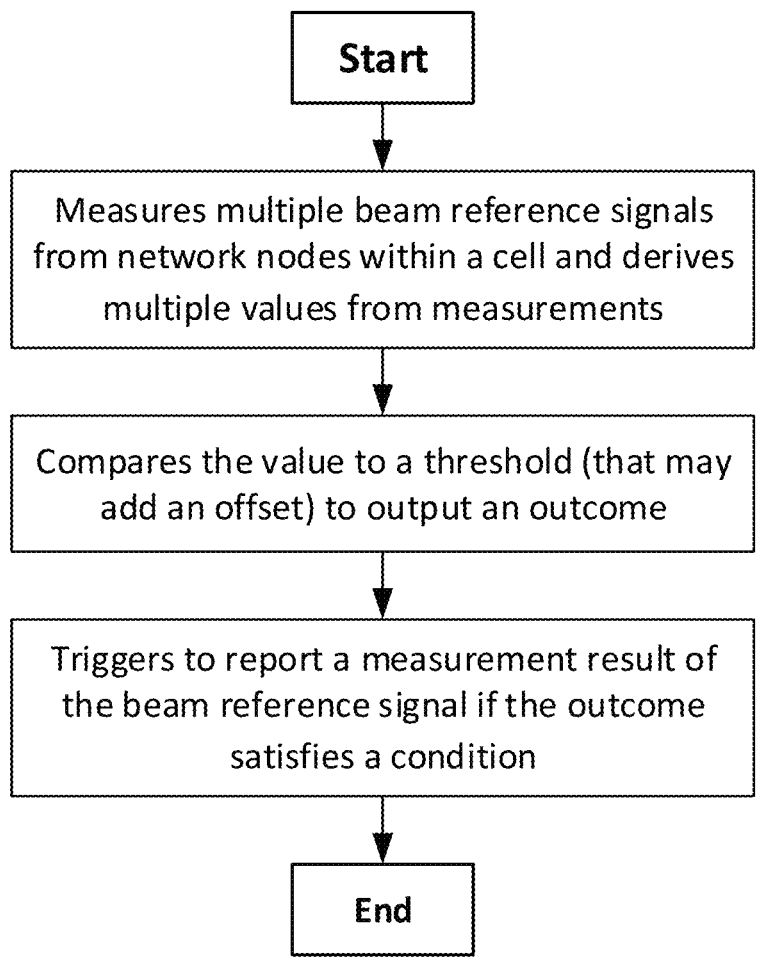
FIG. 22 is a flow diagram for one exemplary embodiment from the perspective of a UE.

FIG. 22 is a flow chart 2200 according to one exemplary embodiment from the perspective of a UE. In step 2205, the UE measures multiple beam reference signals from network nodes within a cell and derives multiple values from measurements. In step 2210, the UE compares the value to a threshold (that may add an offset) to output an outcome. In step 2215, the UE triggers to report a measurement result of the beam reference signal if the outcome satisfies a condition.

In one embodiment of the methods disclosed herein, the value is a power of the beam reference signal (e.g., BRSRP).

In one embodiment of the methods disclosed herein, the threshold represents a minimum power value for a qualified beam. If the power of beam is lower than the threshold, the beam is not a qualified beam.

In one embodiment of the methods disclosed herein, the threshold includes a parameter and an offset, wherein the parameter is a value of a power.

In one embodiment of the methods disclosed herein, the threshold is configured by RRC.

In one embodiment of the methods disclosed herein, the threshold is indicated by PHY signaling (e.g., Physical Downlink Control Channel (PDCCH) in LTE). Alternatively, the threshold is indicated by MAC signaling (e.g., MAC control element in LTE).

In one embodiment of the methods disclosed herein, the threshold is dynamically changed. Alternatively, the threshold is semi-statically changed.

In one embodiment of the methods disclosed herein, the outcome is the result of comparing two values.

In one embodiment of the methods disclosed herein, the condition is the value being higher than the threshold. Alternatively, the condition is the value being lower than the threshold. In another alternative, the condition is the value being equal to the threshold.

In one embodiment of the methods disclosed herein, the value is a highest value of the multiple values, wherein the highest value is the highest power. Alternatively, the value is a lowest value of the multiple values, wherein the lowest value is the lowest power. In another alternative, the value is an average value of the multiple values. The multiple values are the power of multiple serving beams.

In one embodiment of the methods disclosed herein, all of the multiple values are related to serving beams. Alternatively, some of the multiple values are related to serving beams. Alternatively, some of the multiple values are related to non-serving beams.

Figure 23:
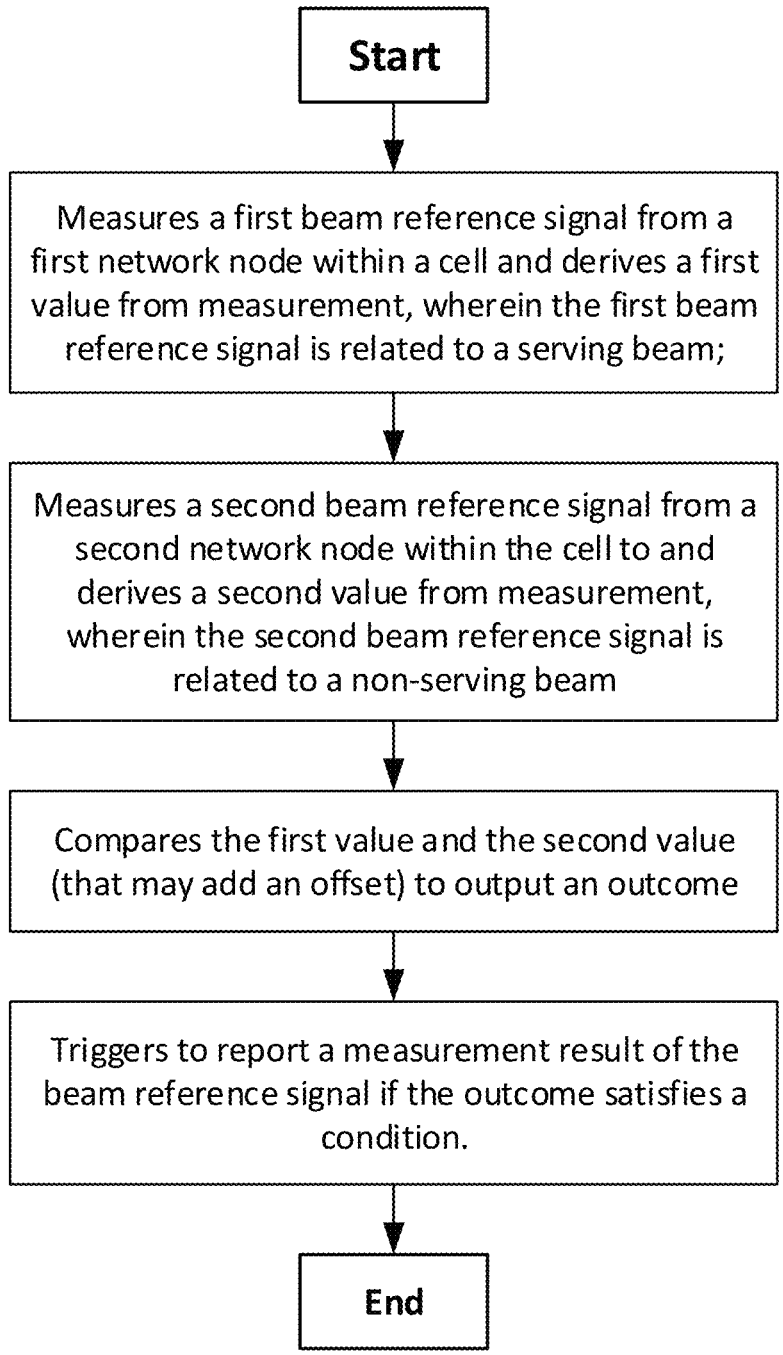
FIG. 23 is a flow diagram for one exemplary embodiment from the perspective of a UE.

FIG. 23 is a flow chart 2300 according to one exemplary embodiment from the perspective of a UE. In step 2305, the UE measures a first beam reference signal from a first network node within a cell and derives a first value from a measurement, wherein the first beam reference signal is related to a serving beam. In step 2310, the UE measures a second beam reference signal from a second network node within the cell and derives a second value from the measurement, wherein the second beam reference signal is related to a non-serving beam. In step 2315, the UE compares the first value and the second value (that may add an offset) to output an outcome. In step 2320, the UE triggers to report a measurement result of the beam reference signal if the outcome satisfies a condition.

The first value may be the lowest value of power (e.g. BRSRP) of the multiple serving beams. Alternatively, the first value may be the highest value of power (e.g. BRSRP) of the multiple serving beams.

The outcome may be result of comparing the first value and the second value. The condition may be that the second value is higher than the first value.

Figure 24:
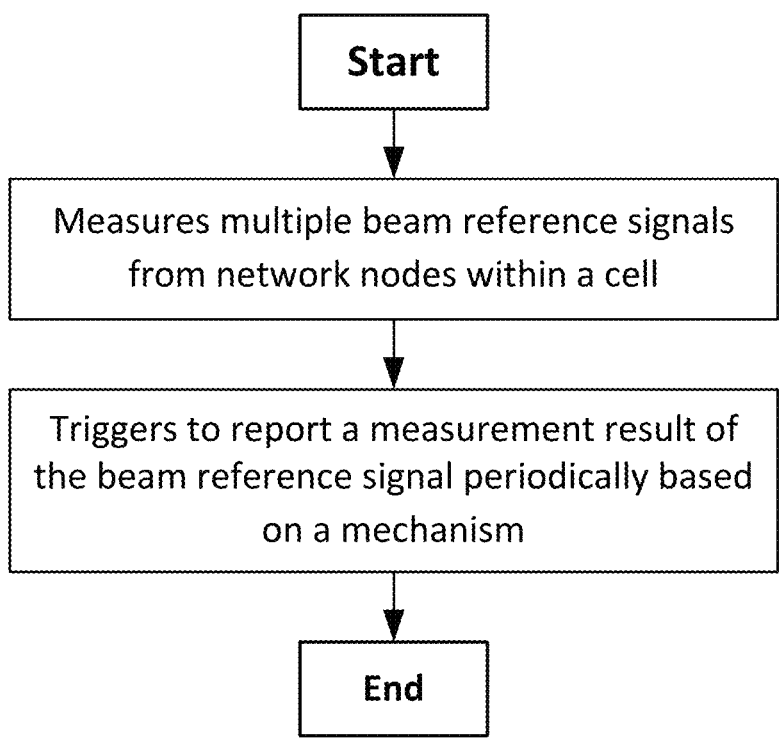
FIG. 24 is a flow diagram for one exemplary embodiment from the perspective of a UE.

FIG. 24 is a flow chart 2400 according to one exemplary embodiment from the perspective of a UE. In step 2405, the UE measures multiple beam reference signals from the network nodes within a cell. In step 2410, the UE triggers to report a measurement result of the beam reference signal periodically based on a mechanism. The mechanism may be based on a timer and/or a counter. The mechanism may be based on the UE transmitting the measurement result of the beam reference signal on a periodic UL resource, wherein the periodic UL resource is configured by a network node.

Figure 25:
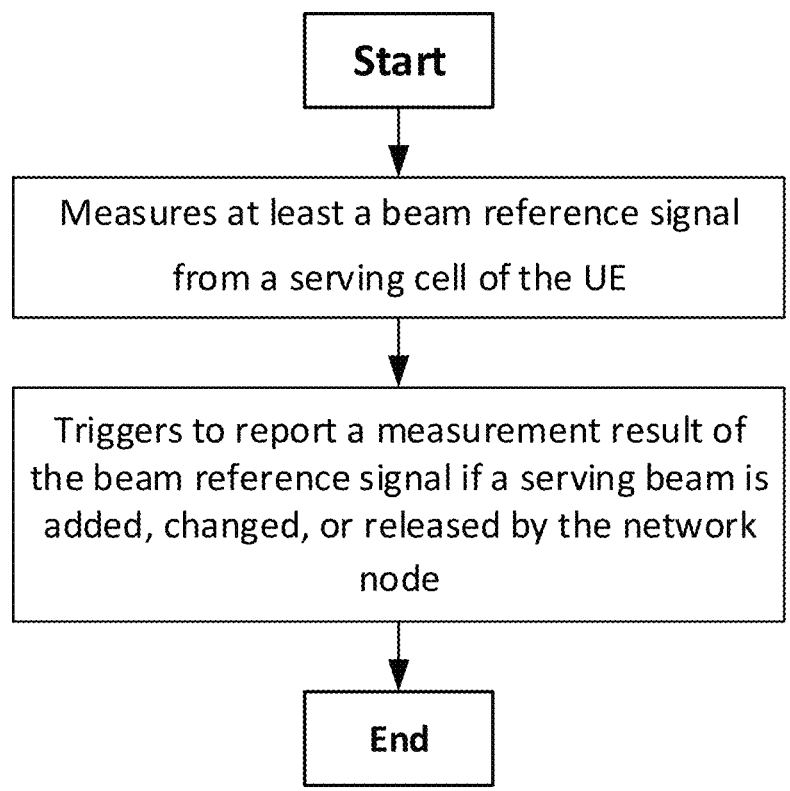
FIG. 25 is a flow diagram for one exemplary embodiment from the perspective of a UE.

FIG. 25 is a flow chart 2500 according to one exemplary embodiment from the perspective of a UE. In step 2505, the UE measures at least a beam reference signal from a serving cell of the UE. In step 2510, the UE triggers to report a measurement result of the beam reference signal if a serving beam is added, changed, or released, by the network node.

Figure 26:
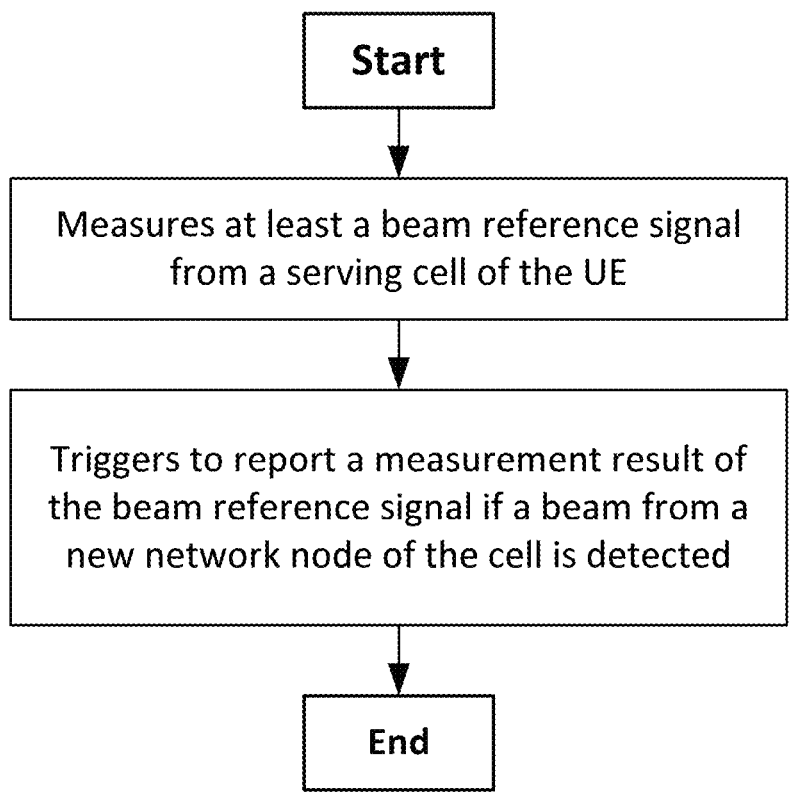
FIG. 26 is a flow diagram for one exemplary embodiment from the perspective of a UE.

FIG. 26 is a flow chart 2600 according to one exemplary embodiment from the perspective of a UE. In step 2605, the UE measures at least a beam reference signal from a serving cell of the UE. In step 2610, the UE triggers to report a measurement result of the beam reference signal if a beam from a new network node of the cell is detected.

Figure 27:
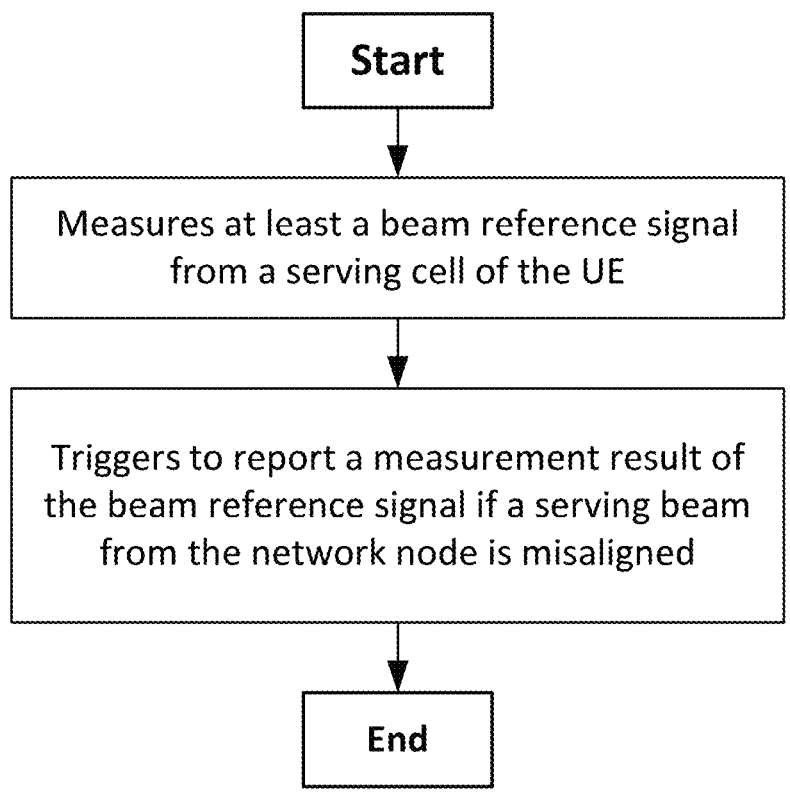
FIG. 27 is a flow diagram for one exemplary embodiment from the perspective of a UE.

FIG. 27 is a flow chart 2700 according to one exemplary embodiment from the perspective of a UE. In step 2705, the UE measures at least a beam reference signal from a serving cell of the UE. In step 2710, the UE triggers to report a measurement result of the beam reference signal if a beam from a new network node of the cell is misaligned.

The new network node may be a network node which is newly added for the UE. The new network node may be a network node without the serving beam.

Figure 28:
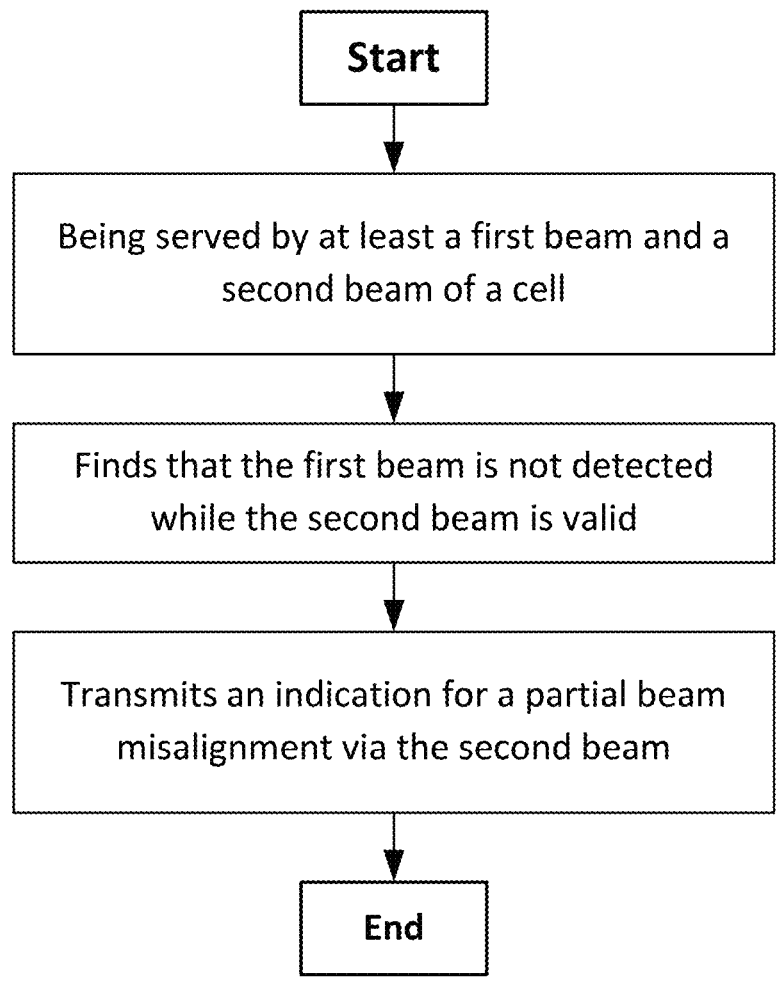
FIG. 28 is a flow diagram for one exemplary embodiment from the perspective of a UE.

FIG. 28 is a flow chart 2800 according to one exemplary embodiment from the perspective of a UE. In step 2805, the UE is being served by at least a first beam and a second beam of a cell. In step 2810, the UE finds that the first beam is not detected while the second beam is valid. In step 2815, the UE transmits an indication for a partial beam misalignment via the second beam.

In one method, the partial beam misalignment means at least one serving beam is misaligned and at least one serving beam is aligned. In another method, the indication may be for beam recovery. In another method, the indication may be a SR preamble, beam adjustment request (BAR), BSI report, or a beam refinement information report. In another method, the indication may indicate at least the status (or radio condition) of the first beam and a third beam.

In one method, serving beam misalignment means the serving beam is not detected by the UE. In one method, serving beam misalignment means the UE cannot receive the BRS from the serving beam. In one method, serving beam misalignment means the BRSPRP of the serving beam is lower than a threshold. In one method, serving beam misalignment means the quality of the serving beam is not good enough for transmission and/or reception. In one method, serving beam misalignment means the serving beam is not qualified.

In one or more of the above-disclosed methods, the offset may be a parameter, positive value, or negative value. The offset may be configured by the RRC.

In one or more of the above-disclosed methods, the beam reference signal is transmitted by the network node.

In one or more of the above-disclosed methods, the beam reference signal allows the UE to track the condition of the DL transmitting beam.

In one or more of the above-disclosed methods, the beam reference signal is transmitted periodically, wherein the period of the beam reference signal is configured by the network node.

In one or more of the above-disclosed methods, the beam reference signal is transmitted aperiodically and/or dynamically by the network node.

In one or more of the above-disclosed methods, the multiple beam reference signals are transmitted by the same network node. Alternatively, the multiple beam reference signals are transmitted by different network nodes.

In one or more of the above-disclosed methods, the measurement result of the beam reference signal is a BSI. Alternatively, the measurement result of the beam reference signal is a BRI.

In one or more of the above-disclosed methods, the measurement result of the beam reference signal includes the result of at least one serving beam. In one or more of the above-disclosed methods, the measurement result of the beam reference signal includes the result of one or more serving beams and one or more non-serving beams.

In one or more of the above-disclosed methods, the measurement result of the beam reference signal is reported by PHY signaling (e.g., Uplink Control Information (UCI)). Alternatively, the measurement result of the beam reference signal is reported by MAC signaling (e.g., MAC Control Element (CE) or MAC Packet Data Unit (PDU)).

In one or more of the above-disclosed methods, the trigger to report a measurement result of the beam reference signal means initiating a procedure of a BSI report. Alternatively, the trigger to report a measurement result of the beam reference signal means initiating a procedure of BRI report.

In one or more of the above-disclosed methods, the serving beam is a beam generated by the network node, wherein the beam is currently used to communicate with the UE.

In one or more of the above-disclosed methods, the non-serving beam is a beam generated by the network node, wherein the beam is not currently used to communicate with the UE. Alternatively, the non-serving beam is a candidate beam that is a candidate of the serving beam.

In one or more of the above-disclosed methods, the network node is a TRP.

In one or more of the above-disclosed methods, the cell includes at least one network node.

Figure 29:
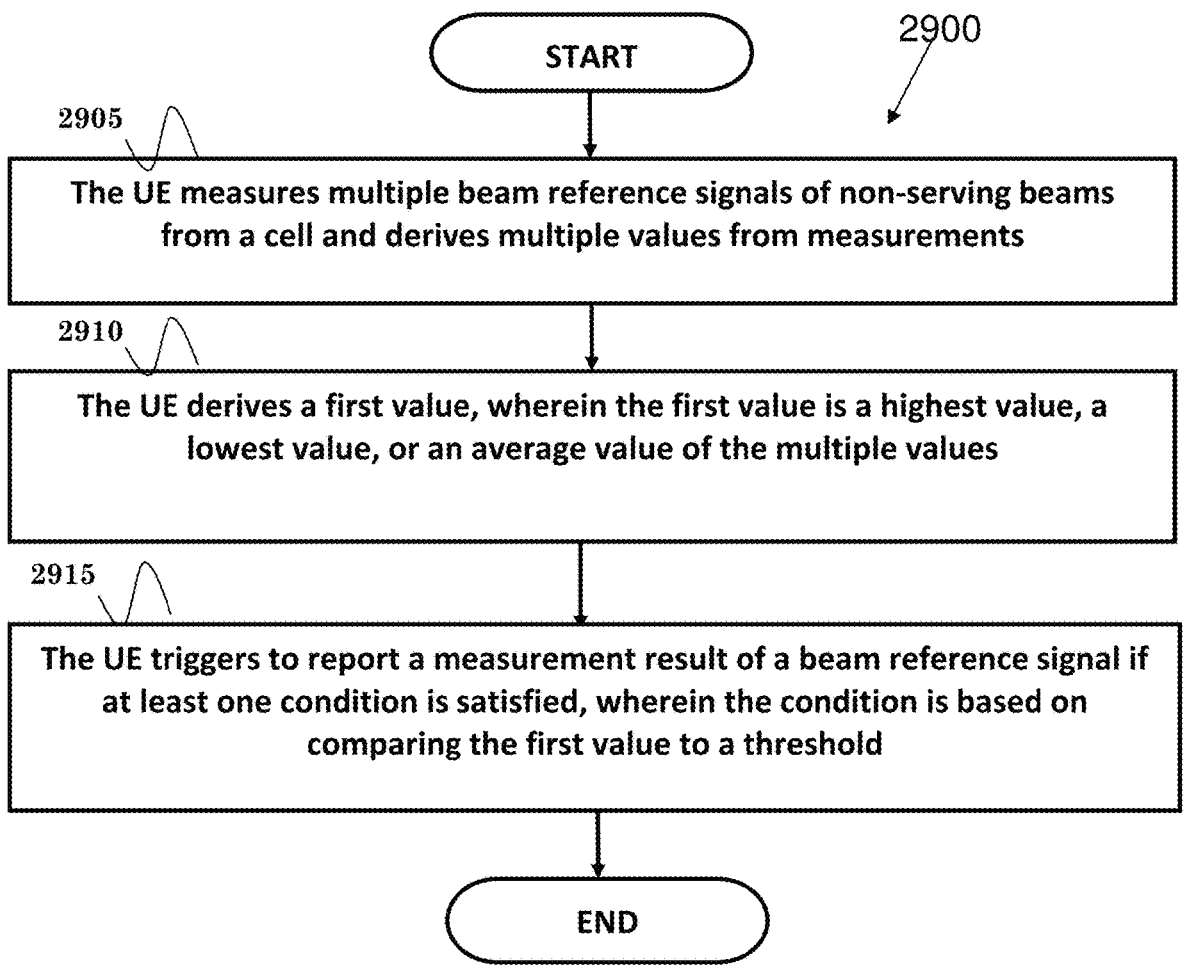
FIG. 29 is a flow diagram for one exemplary embodiment from the perspective of a UE.

FIG. 29 is a flow chart 2900 according to one exemplary embodiment from the perspective of a UE. In step 2905, the UE measures multiple beam reference signals of non-serving beams from a cell and derives multiple values from measurements. In step 2910, the UE derives a first value, wherein the first value is a highest value, a lowest value, or an average value of the multiple values. In step 2915, the UE triggers to report a measurement result of a beam reference signal if at least one condition is satisfied, wherein the condition is based on comparing the first value to a threshold.

In one of the above-disclosed methods, the condition is satisfied when the first value is greater than the threshold.

In one of the above-disclosed methods, the beam reference signal is for the UE to track the condition of a downlink transmitting beam.

In one of the above-disclosed methods, the beam reference signal is transmitted periodically, wherein the periodic transmission of the beam reference signal is configured by the cell.

In one of the above-disclosed methods, the beam reference signal is transmitted aperiodically by the cell.

In one of the above-disclosed methods, the non-serving beam is a beam generated by the cell and is not currently used to communicate with the UE.

In one of the above-disclosed methods, the non-serving beam is a candidate beam that is a candidate of the serving beam.

Figure 30:
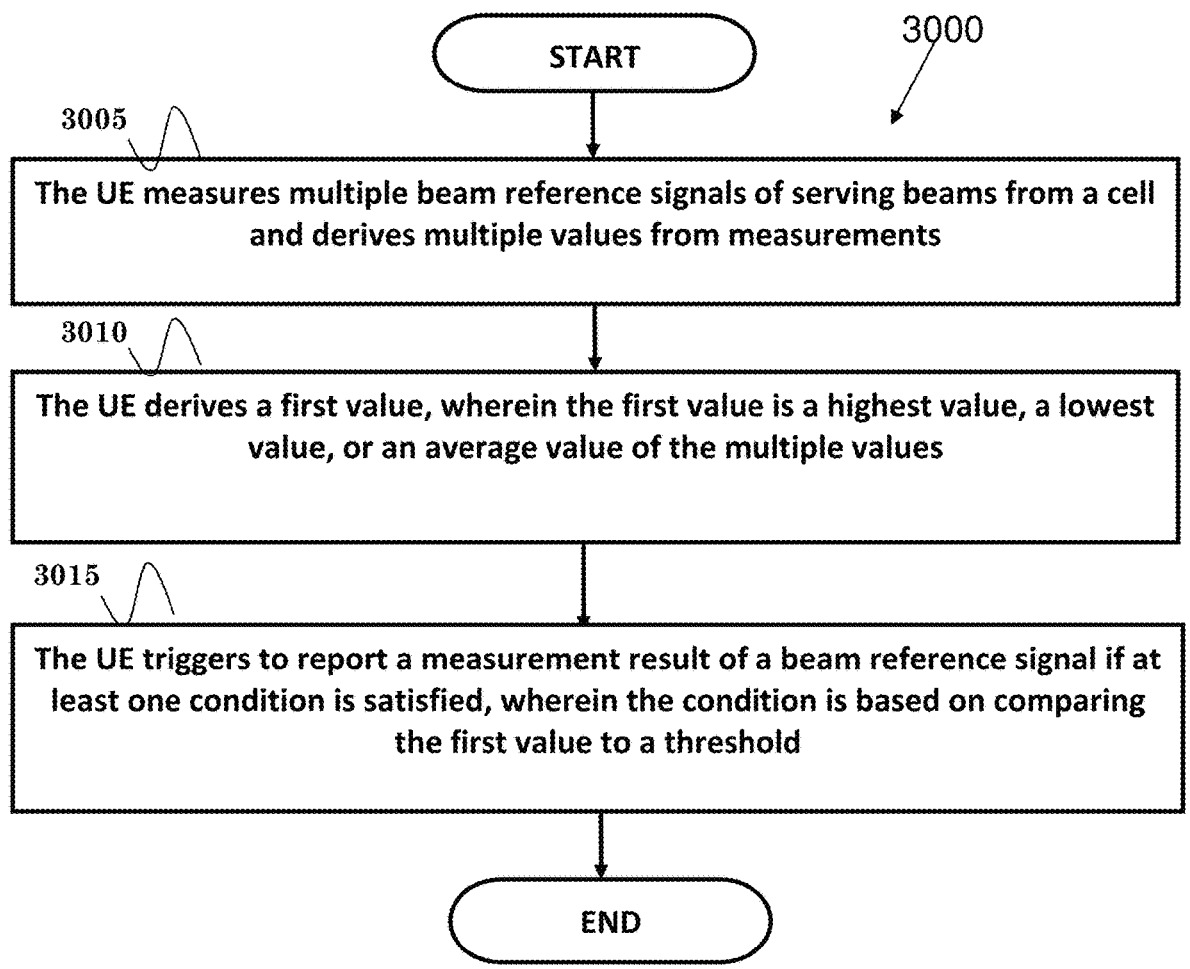
FIG. 30 is a flow diagram for one exemplary embodiment from the perspective of a UE.

FIG. 30 is a flow chart 3000 according to one exemplary embodiment from the perspective of a UE. In step 3005, the UE measures multiple beam reference signals of serving beams from a cell and derives multiple values from measurements. In step 3010, the UE derives a first value, wherein the first value is a highest value, a lowest value, or an average value of the multiple values. In step 3015, the UE triggers to report a measurement result of a beam reference signal if at least one condition is satisfied, wherein the condition is based on comparing the first value to a threshold.

In one of the above-disclosed methods, the condition is satisfied when the first value is lower than the threshold.

In one of the above-disclosed methods, the beam reference signal is for the UE to track the condition of a downlink transmitting beam.

In one of the above-disclosed methods, the beam reference signal is transmitted periodically, wherein the periodic transmission of the beam reference signal is configured by the cell.

In one of the above-disclosed methods, the beam reference signal is transmitted aperiodically by the cell.

In one of the above-disclosed methods, the serving beam is a beam generated by the cell and is currently used to communicate with the UE.

Figure 31:
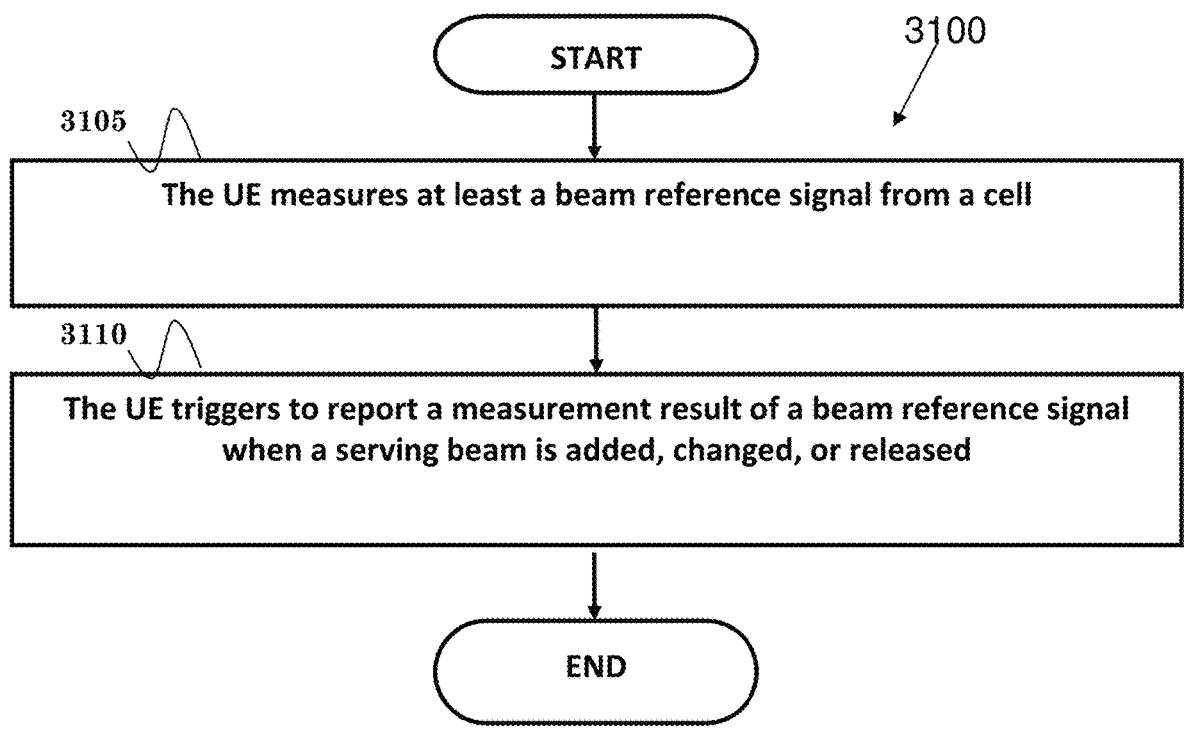
FIG. 31 is a flow diagram for one exemplary embodiment from the perspective of a UE.

FIG. 31 is a flow chart 3100 according to one exemplary embodiment from the perspective of a UE. In step 3105, the UE measures at least a beam reference signal from a cell. In step 3110, the UE triggers to report a measurement result of a beam reference signal when a serving beam is added, changed, or released.

In one of the above-disclosed methods, the serving beam being added, changed, or released is based on an indication from a network node.

In one of the above-disclosed methods, the beam reference signal is used by the UE to track the condition of a downlink transmitting beam.

In one of the above-disclosed methods, the beam reference signal is transmitted periodically, wherein the periodic transmission of the beam reference signal is configured by the cell.

In one of the above-disclosed methods, the beam reference signal is transmitted aperiodically by the cell.

In one of the above-disclosed methods, the serving beam is a beam generated by the cell and is currently used to communicate with the UE.

Referring back to FIGS. 3 and 4, in one embodiment, the device 300 includes a program code 312 stored in memory 310. The CPU 308 could execute program code 312 to enable the UE (i) to measure multiple beam reference signals of non-serving beams from a cell and derives multiple values from measurements; (ii) to derive a first value, wherein the first value is a highest value, a lowest value, or an average value of the multiple values; and (iii) to trigger to report a measurement result of a beam reference signal if at least one condition is satisfied, wherein the condition is based on comparing the first value to a threshold.

In another embodiment, the CPU 308 could execute program code 312 to enable the UE (i) to measure multiple beam reference signals of serving beams from a cell and derives multiple values from measurements; (ii) to derive a first value, wherein the first value is a highest value, a lowest value, or an average value of the multiple values; and (iii) to trigger to report a measurement result of a beam reference signal if at least one condition is satisfied, wherein the condition is based on comparing the first value to a threshold.

In another embodiment, the CPU 308 could execute program code 312 to enable the UE (i) to measure a beam reference signal from a cell; and (ii) to trigger to report a measurement result of a beam reference signal when a serving beam is added, changed, or released.

Furthermore, the CPU 308 can execute the program code 312 to perform all of the above-described actions and steps or others methods described herein.

BSI or BRI report is needed to provide the condition of beam state to the network for maintaining better quality of serving beam(s) of the UE. Triggering or requesting BSI or BRI report by network is not sufficient for every situation, so some events are required to trigger by a UE. Based on the invention, methods are provided for triggering BSI or BRI report by a UE, especially with multiple serving beams.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a user equipment (UE), the method comprising:
maintaining at least a first serving beam and a second serving beam;
communicating with a cell via the first serving beam and the second serving beam concurrently;
detecting, at the UE, serving beam misalignment for the first serving beam while the second serving beam is aligned;
transmitting, by the UE to the cell, an indication via a beam report for the serving beam misalignment for the first serving beam via the second serving beam; and
receiving, from the cell in response to the transmitted beam report indication, a beam change indication.

2. The method of claim 1, wherein the first serving beam and the second serving beam are from different TRPs.

3. The method of claim 1, further comprising: receiving the beam change indication to change the first serving beam.

4. The method of claim 1, wherein the indication for the serving beam misalignment is for beam recovery.

5. The method of claim 1, wherein the indication indicates radio condition of the first serving beam.

6. The method of claim 1, wherein the serving beam misalignment means the serving beam is not detected by the UE.

7. The method of claim 1, wherein the first and second serving beams are beams generated by the cell to communicate with the UE.

8. The method of claim 1, wherein the indication includes an indication that the first serving beam should be released.

9. A User Equipment (UE), comprising:
a processor; and
a memory operatively coupled to the processor, wherein the processor is configured to execute a program code to:
maintain at least a first serving beam and a second serving beam;
communicate with a cell via the first serving beam and the second serving beam concurrently;
detect, at the UE, serving beam misalignment for the first serving beam while the second serving beam is aligned;
transmit, by the UE to the cell, an indication via a beam report for the serving beam misalignment for the first serving beam via the second serving beam; and
receive, from the cell in response to the transmitted beam report indication, a beam change indication.

10. The UE of claim 9, wherein the first serving beam and the second serving beam are from different TRPs.

11. The UE of claim 9, further comprising: receiving the beam change indication to change the first serving beam.

12. The UE of claim 9, wherein the indication for the serving beam misalignment is for beam recovery.

13. The UE of claim 9, wherein the indication indicates radio condition of the first serving beam.

14. The UE of claim 9, wherein the serving beam misalignment means the serving beam is not detected by the UE.

15. The UE of claim 9, wherein the first and second serving beams are beams generated by the cell to communicate with the UE.

16. The method of claim 9, wherein the indication includes an indication that the first serving beam should be released.

17. A method of a user equipment (UE), the method comprising:
maintaining at least a first serving beam and a second serving beam;
communicating with a cell via the first serving beam and the second serving beam concurrently;
detecting, at the UE, serving beam misalignment for the first serving beam while the second serving beam is aligned;
transmitting, by the UE to the cell, an indication via a signaling for the serving beam misalignment for the first serving beam via the second serving beam; and
receiving, from the cell in response to the transmitted signaling indication, a beam change indication.

18. The method of claim 17, wherein the indication signaling is one of a SR preamble, a beam adjustment request (BAR), a beam state information (BSI) report, a beam refinement information (BRI) report, or a random access preamble.

19. The method of claim 17, wherein the first serving beam and the second serving beam are from different TRPs.

20. The method of claim 17, wherein the first and second serving beams are beams generated by the cell to communicate with the UE.

* * * * *